United States Patent
Croney et al.

(10) Patent No.: US 7,281,202 B2
(45) Date of Patent: Oct. 9, 2007

(54) FRAMEWORK FOR CREATING MODULAR WEB APPLICATIONS

(75) Inventors: Joseph Keith Croney, Christiansted, VI (US); Nikhil Kothari, Sammamish, WA (US); Michael Harder, Redmond, WA (US); Gregory S. Lindhorst, Seattle, WA (US); Andres Sanabria, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 434 days.

(21) Appl. No.: 10/465,269

(22) Filed: Jun. 19, 2003

(65) Prior Publication Data

US 2004/0268228 A1 Dec. 30, 2004

(51) Int. Cl.
*G06F 15/00* (2006.01)
(52) U.S. Cl. .................... 715/505; 715/501.1; 715/513; 715/515; 715/517
(58) Field of Classification Search ............. 715/500.1, 715/513, 517, 505, 515, 501.1
See application file for complete search history.

(56) References Cited

U.S. PATENT DOCUMENTS

| | | | | |
|---|---|---|---|---|
| 5,940,834 | A * | 8/1999 | Pinard et al. ............... | 707/102 |
| 5,953,526 | A * | 9/1999 | Day et al. ................... | 717/108 |
| 5,983,227 | A * | 11/1999 | Nazem et al. ................ | 707/10 |
| 6,247,032 | B1 * | 6/2001 | Bernardo et al. ........... | 715/530 |
| 6,313,854 | B1 * | 11/2001 | Gibson ....................... | 715/788 |
| 6,327,628 | B1 * | 12/2001 | Anuff et al. ................. | 719/311 |
| 6,684,369 | B1 * | 1/2004 | Bernardo et al. ........... | 715/513 |
| 6,957,416 | B2 * | 10/2005 | Adams ....................... | 717/107 |
| 2002/0033844 | A1 * | 3/2002 | Levy et al. .................. | 345/744 |
| 2002/0122060 | A1 * | 9/2002 | Markel ........................ | 345/760 |
| 2002/0138331 | A1 * | 9/2002 | Hosea et al. ................. | 705/10 |
| 2003/0084059 | A1 * | 5/2003 | Kelley et al. ............... | 707/102 |
| 2004/0148340 | A1 * | 7/2004 | Cotte ........................... | 709/203 |
| 2004/0205594 | A1 * | 10/2004 | Arora et al. ................. | 715/513 |

OTHER PUBLICATIONS

Microsoft, "Computer Dictionary: Fifth Edition", 2002, Microsoft Press, 5th Edition, pp. 279-280, 399.*
Jackson et al, "Java by example", 1996, SunSoft Press, pp. 27-28, 295-296.*
Manske, Charles, "Composer 5 Dialogs", published as Last Updated May 13, 1999, pp. 1-3 <https://doctor.mozilla.org/doctor.cgi?file=mozilla-org/html/editor/ui_specs/Composer_5_Dialogs.html&action=display>.*
Wege, C. "Portal Server Technology", IEEE Internet Computing, IEEE Service Center, New York, NY, May 2002, pp. 73-77.

* cited by examiner

*Primary Examiner*—Stephen Hong
*Assistant Examiner*—David Faber
(74) *Attorney, Agent, or Firm*—Workman Nydegger

(57) ABSTRACT

A framework for creating modular web pages. The framework enables the development of modular, customized, and personalized web applications including web portals and web pages. The framework includes an extensible part base class and an extensible zone base class. Part controls that derive from the part base class include web part controls, editor part controls, and catalog part controls. Zone controls, editor zone controls, and catalog zone controls derive from the zone base class. Each zone control contains one or more part controls and each zone is responsible for rendering part controls within each respective zone. Web part controls can communicate with other web part controls. Web part controls can be edited, removed, or added to a zone control. The functionality of part controls can vary widely among the part controls in a particular zone and across different zones.

54 Claims, 14 Drawing Sheets

| WebPart Appearance | |
|---|---|
| Title: | My WebPart |
| Height: | |
| Width: | |
| Frame State: | Normal ▾ |
| Frame Type: | Default ▾ |

| WebPart Layout | |
|---|---|
| Hidden: | ☐ |
| Direction: | Default ▾ |
| Zone: | Main Zone ▾ |
| ZoneIndex: | 3 |

| Behavior | |
|---|---|
| Allow Close: | ☑ |
| Allow Minimize: | ☑ |
| Allow Export: | ☑ |
| Description: | |
| Title Link: | |
| Edit Link: | |
| Help Link: | |
| Allowed Roles: | |
| Allow Personalize: | ☑ |

FRAMEWORK FOR CREATING MODULAR WEB APPLICATIONS

BACKGROUND OF THE INVENTION

1. The Field of the Invention

The present invention generally relates to systems and methods for creating web applications. More specifically, the present invention relates to systems and methods for creating web applications including web pages using a modular and customizable framework.

2. Background and Relevant Art

The proliferation of local area networks and wide area networks has facilitated the retrieval and delivery of data. Commonly, a computer user can retrieve information through a simple point and click interface such as those commonly existing on web pages and web sites. A web portal is a common type of web site or web page that offers a variety of services to a user. Web portals may contain welcome information, search capabilities, weather information, news information, stock data, links to other sites or pages, and the like.

Experience has shown that organized and visually appealing web portals are more effective in meeting the needs of the users of the web portals. Further, because a web portal is often the first page used in an Internet or intranet session, the web portal should be customizable such that the web portal presents content that is of interest to the user and such that the user can organize the content in a manner that makes logical sense to the user or is visually pleasing to the user.

Many web developers have attempted to create sites or web portals that both attract and retain users. A common approach is to have a site conform to a modular layout such that related content is placed in certain areas of the page. Web portals are not the only pages that can benefit from a layout that is modular and customizable. Web sites or pages in general on the Internet or on an intranet, project pages, meeting pages, inventory tracking pages, etc., can also benefit from such a layout.

The design and development of such pages or sites is difficult because few tools exist for quickly and efficiently creating such pages. Each web page developer must create their own code or design for such pages. As a result, developers are discouraged from creating such pages, resulting in the proliferation of less usable and less readable pages. Further, when such pages are created by page developers, the pages are not exportable for use by other developers. It is also difficult to create a customizable site that has a consistent look and feel using current technology.

One technology that has assisted web developers in creating web pages and websites is the use of scripts that are run on a web page server. These scripts can be embedded among other HTML commands to create web pages that are dynamic and customizable. The customizability of web pages, however, currently comes at a high cost because these types of web pages require significant development investment. In other words, successful web sites with rich content, modularized and consistent design, and customizability are difficult to build because they require substantial development time and because portal solutions do not currently have a consistent model.

BRIEF SUMMARY OF THE INVENTION

These and other limitations are overcome by the present invention which relates to systems and methods for creating modular, customizable web applications. More particularly, the present invention relates to an extensible framework for creating web applications such as web portals, web pages, etc. The framework includes part controls such as web parts, editor parts, and catalog parts. The framework also includes zone controls such as zones, editor zones, and catalog zones. Each zone control typically contains one or more part controls.

Each part control derives from a part base class and each zone control derives from a zone base class. Web parts, editor parts, and catalog parts provide additional functionality in addition to the functionality provided by the part base class. The zones, editor zones, and catalog zones also provide additional functionality in addition to the functionality provided by the zone base class.

A web application such as a web page can be broken down into zones and various part controls have been placed into each zone. Each zone is responsible for rendering the chrome around each part within the particular zone. This controls the look and feel of the title bar, border, and verbs. This promotes a consistent look and feel as the web page is customized or personalized by the addition, removal, or alteration of part controls. Editor parts are used to edit web parts while catalog parts are used to add/remove web parts from a zone. Editor parts are contained by editor zones and catalog parts are contained by catalog zones.

The part controls and the zone controls have associated properties and methods. Some of the properties and methods permit the part controls to be personalized on a per user basis while other permit the part controls to be customized by a developer for all users. The properties of web parts can be exported/imported. Web parts can also be hidden or made visible.

During the creation of a web page, the zone controls are declared in a persistence format file. Part controls are declared within each zone control. A web part manager, which tracks the web parts in the various declared zones is also declared. Each zone typically registers with the web part manager. One advantage of the web part manager is that it enables one web part to communicate with another web part. This enables the content of one web part to be used by another web part, for example.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 8A, 8B and 8C illustrate parts on the web page for controlling appearance, layout and behavior;

DETAILED DESCRIPTION OF THE PREFERRED EMBODIMENTS

The present invention extends to both methods and systems for creating modular web applications. More particularly, the present invention relates to systems and methods for creating modular web pages that support end user personalization or customization. One embodiment of the present invention provides an infrastructure or framework that can be used to create web applications that are modular, content rich, and customizable.

In one embodiment, the framework includes the use of server side and client side behaviors and permits controls to share information with other controls. The framework includes, for example, extensible base classes and controls. In one embodiment, the framework includes part controls, zone controls, and a part manager.

The part controls typically contain properties that permit the part controls to be presented to a user in a consistent fashion even though the functionality of a particular part control may differ significantly from the functionality of another part control. The properties of the part controls are used, for example, to render a consistent window or user interface around the control. The user interface may include, in one embodiment, a title bar, minimize, maximize, and close verbs, and a surrounding border. Several different base classes are used to create part controls. Exemplary part controls include, but are not limited to, web part controls, editor part controls, and catalog part controls.

Zone controls are typically employed to arrange part controls in a modular or consistent fashion. Zones are responsible for rendering the user interface of each part. For example, if the properties of a part control include a chrome user interface, then the zone control that contains that particular part control is responsible for rendering the chrome user interface of that part control. Examples of classes used to create zone controls include but are not limited to, a zone base class used to layout all controls which inherit from a part, an editor zone class, and a catalog zone class. Some embodiments of the present invention further include the ability to export personalization or customization characteristics set by one user for use by other users. Third-party generated classes can also be incorporated into the framework.

Figure 1:
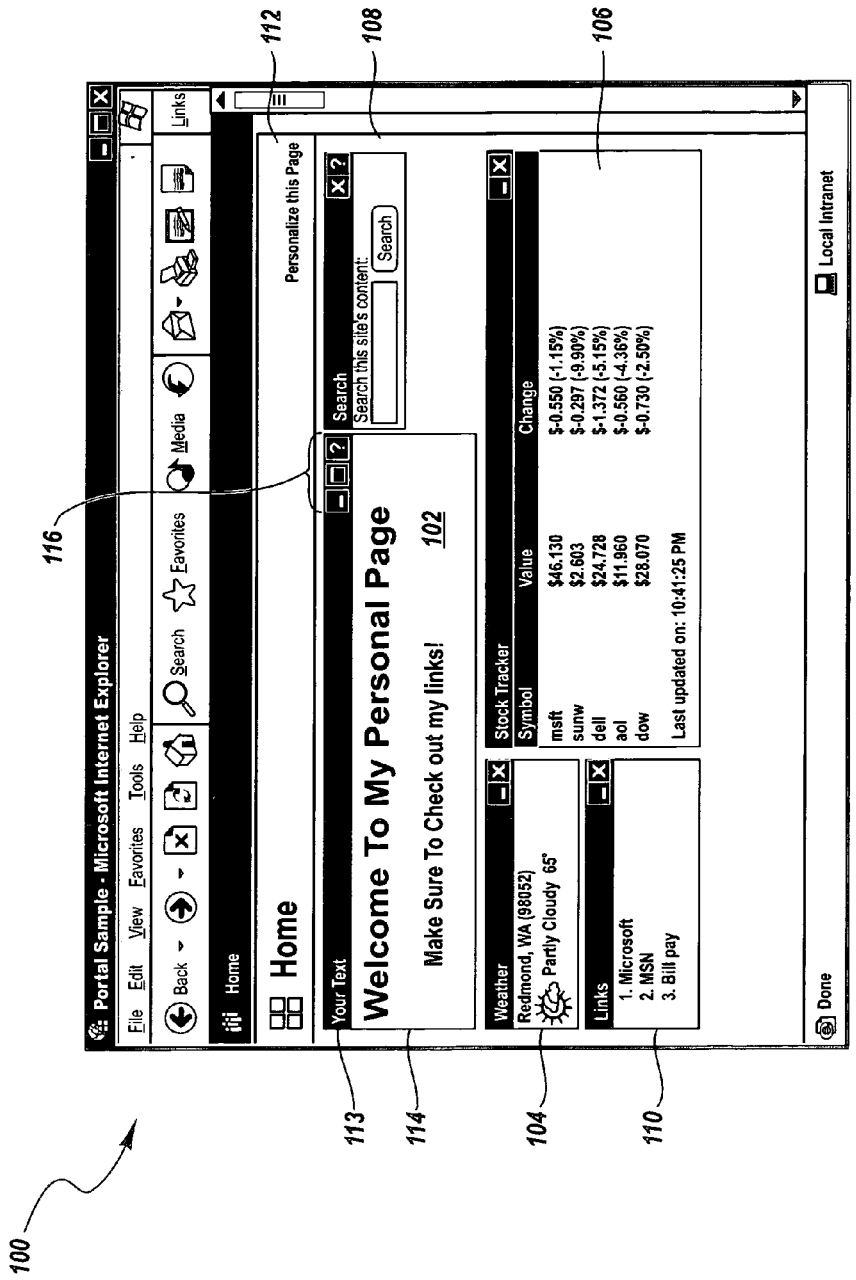
FIG. 1 illustrates an example of a modular web portal.

FIG. 1 illustrates an example of a customizable, modular web page. The web portal is shown as a web page 100 that includes modularly organized information or data. For example, web page 100 includes welcome information in a web part 102, weather information in a web part 104, stock information in a web part 106, a search window web part 108, and a selection of links in a web part 110. The web page 100 further includes a personalization link 112 for allowing a user to personalize the web page 100 according to the user's own tastes and preferences. These web parts are created by reference to a web part base class, sometimes referred to as web part controls, in the web part framework.

Figure 2:
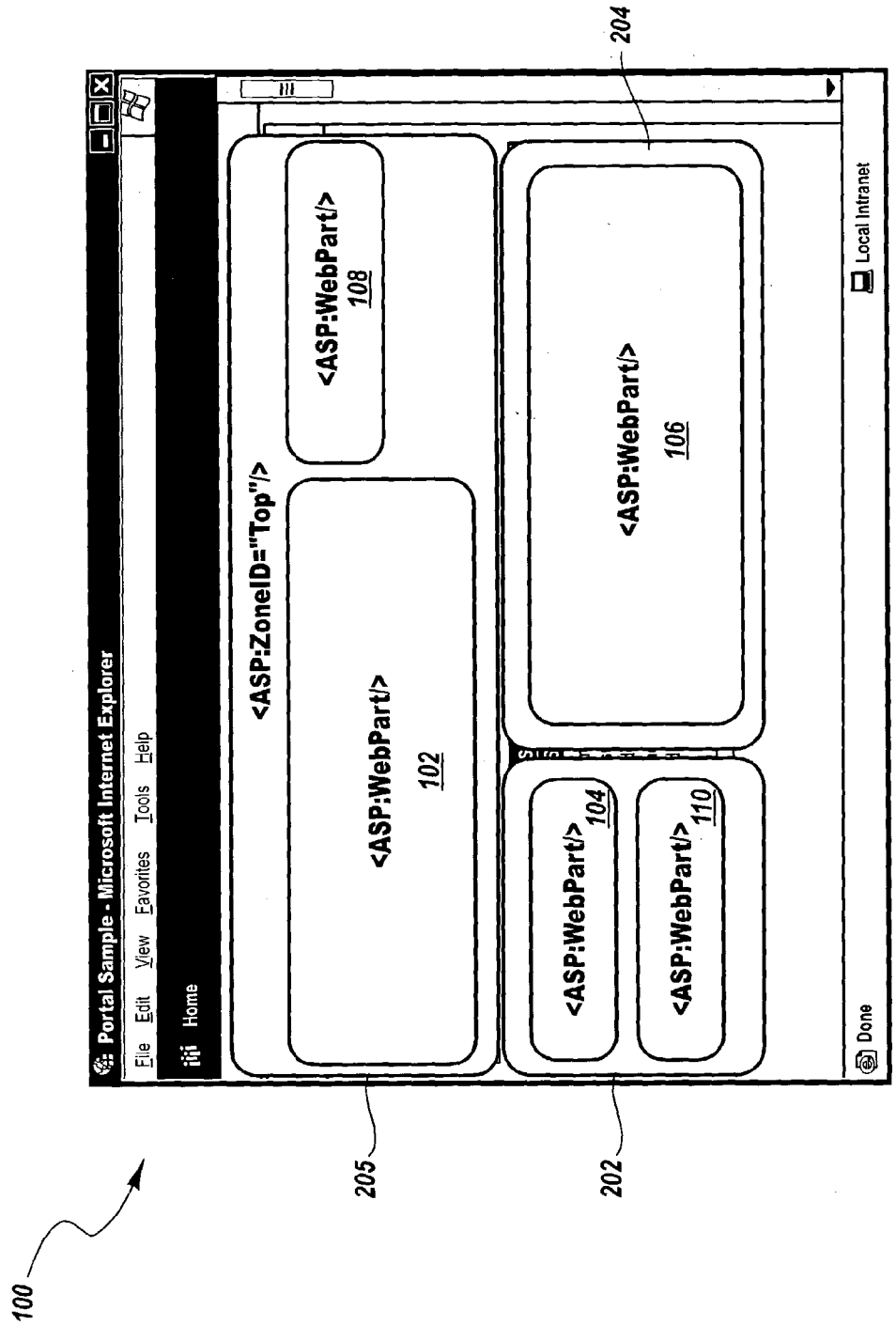
FIG. 2 illustrates the zone layout of the web portal shown in FIG. 1.

In one embodiment of the invention, the look and feel of the web parts can be controlled in some respects through the use of zones. Referring now to FIG. 2, three web zones used to define the characteristics of the web parts shown in FIG. 1 are shown. The web page 100 includes three zones, including a top zone 205, a left zone 202 and a right zone 204. Note that the top zone includes the welcome web part 102 and the search web part 108. The left zone 202 includes the weather web part 104 and the links web part 110. The right zone 204 includes a single web part, namely the stock web part 106. By grouping web parts within a zone, the zone association can help to coordinate the look and feel of the individual web parts disposed in the particular zone. The zone accomplishes this coordination by controlling how the user interface is rendered. The user interface includes (as illustrated in FIG. 1) such things as the title 113 and the frame 114. The user interface may also include such things as the verbs 116.

The following is one example of a persistence format file (.aspx in this instance) used to generate the portal shown in FIGS. 1 and 2. Highlighted are the areas where zones and web parts are defined.

```
<%@ Page language = "C#" %>
<%@ Regiser TagPrefix="SampleParts" Assembly="Sample.web.user interface"
Namespace="Sample.web.user interface"%>
<html>
<head>
    <link rel="stylesheet" href="Default.css" type="text/CSS" />
    <title>Portal Sample</title>
    <asp:WebPart manager runat=server />
</head>
```

-continued

```
<body>
<form runat="server">
    <table>
        <tr>
            <td><img src="Logo.gif" >Home</td>
        </tr>
        <tr>
            <td>
                <table>
                    <tr>
                        <td>
                            <asp:WebPartZone runat="server" ID="TopZone" Caption="Top"
                                    <Orientation="Horizontal">
                                <ZoneTemplate>
                                        <SampleParts:ContentwebPart runat="server" />
                                        <SampleParts:SearchWebPart runat="server" />
                                </ZoneTemplate>
                            </asp:WebPartZone >
                        </td>
                    </tr>
                    <tr style="height : 100%">
                        <td valign="top">
                            <asp:WebPartZone runat="server" ID LeftZone"
Caption="Sidebar" >
                                <ZoneTemplate>
                                        <SampleParts:WeatherWebPart
runat="server" Caption="Weather" />
                                        <SampleParts:QuickLaunchWebPart runat="server"
Caption="Links"
                                                Description ="Favorite Links" />
                                </ZoneTemplate>
                            </asp:WebPartZone>
                        </td>
                        <td valign="top">
                            <asp:WebPartZone runat="server" ID "RightZone"
                                Caption="Main Content" Width="100%">
                                <ZoneTemplate>
                                        <SampleParts:StocksWebPart runat="server"
                                                Caption="Stock Tracker" Font-Name="Verdana"/>
                                </ZoneTemplate>
                            </asp:WebPartZone>
                        </td>
                    </tr >
                </table>
            </td>
        </tr>
    </table>
</form>
</body>
</html>
```

While the modular web pages shown in FIG. 1 and FIG. 2 may be created by calls to various classes in the framwork of the invention, such as in one example by calls by .aspx files in the ASP.net framework, other customized pages and web parts may be created by declaring a control in a control format file, in this case a .asex file, and referencing that control format file in a zone. FIG. shows a web page 300 generated by just such a process. The .asex and .aspx code is as follows.

Events.asex:

```
<%@ Control Language="C#" EnablePersonalization="true" %>
<script runat="server">
            void Page_load (Object sender, EventArgs e) {
                    // Obtain the list of events from the Events table
                    // and bind to the DataList Control
                    ASPNETPortal.EventsDB events = new ASPNETPortal.EventsDE( );
                    myDataList.DataSource = events.GetEvents(4) ;
                    myDataList.DataBind ( )
            }
</script>
<asp:DataLast id="myDataLast runat="server" EnableViewStable="false"
Width="98%">
            <ItemTemplate>
                <span class="ItemTitle">
                    <asp:HyperLank id="editLink ImageUrl="-/images/edit.gif"
```

```
-continued
runat="server" />
            <asp:Label Text='<%# DataBander.Eval (Container.DataItem, "Title")
%>'
                runat="server" />
            </span>
        <br />
        <span class="Normal">
            <%# DataBinder.Eval (Conatainer.DataItem, "WhereWhen") %>
        </span>
        <br />
        <span class="Normal">
            <%# DataBinder.Eval (Container.DataItem, "Description") %>
        </span>
        <br />
    </ItemTemplate>
</asp:DataList>
```

Page.aspx

```
<%@ Page Master="..\Themes\Portal\Page.master" Theme="Portal"
        Enablepersonalization="true" %>
<%@ Register TagPrefix="my" TagName="Events" Src="Events.ascx" %>
<%@ Register TagPrefix="Sample" NameSpace="Sample.web.user interface" %>
<asp:Content runat="server" ContentName="LeftZone">
    <asp:WebPartZone runat="server" id="sidebarZone" Caption="Sidebar"
Width="100%">
        <ZoneTemplate>
            <my:Events runat="server" ID="Events" />
        </ZoneTemplate>
    </asp:WebPartZone>
</asp:content>
<asp:Content runat="server" ContentName="MainZone">
    <asp:WebPartZone runat= "server" id="mainZone" Caption="Main Body"
        Width="100%">
        <ZoneTemplate>
            <sample:announcements runat=server />
            <sample:QuickLinks runat=server />
        </ZoneTemplate>
    </asp:WebPartZone>
</asp Content>
<asp:Content runat="server" ContentName="RightZone">
<asp:WebPartEditorToolPane runat="server" Height="100%" />
</asp:Content>
```

Configuring a web part includes setting control properties. Configuration settings can be made by the application developer, administrators, and/or end users. Configuration settings made by the developer or administrator are called custom settings while settings made by end users are known as personal settings. Accordingly end users personalize or customize a site or page using the personal settings, while developers and administrators can customize a site or page using the custom settings. In one embodiment, custom settings are seen by all users of the site. Personal settings are typically only seen by the individual user who made the personal setting.

Figure 4:
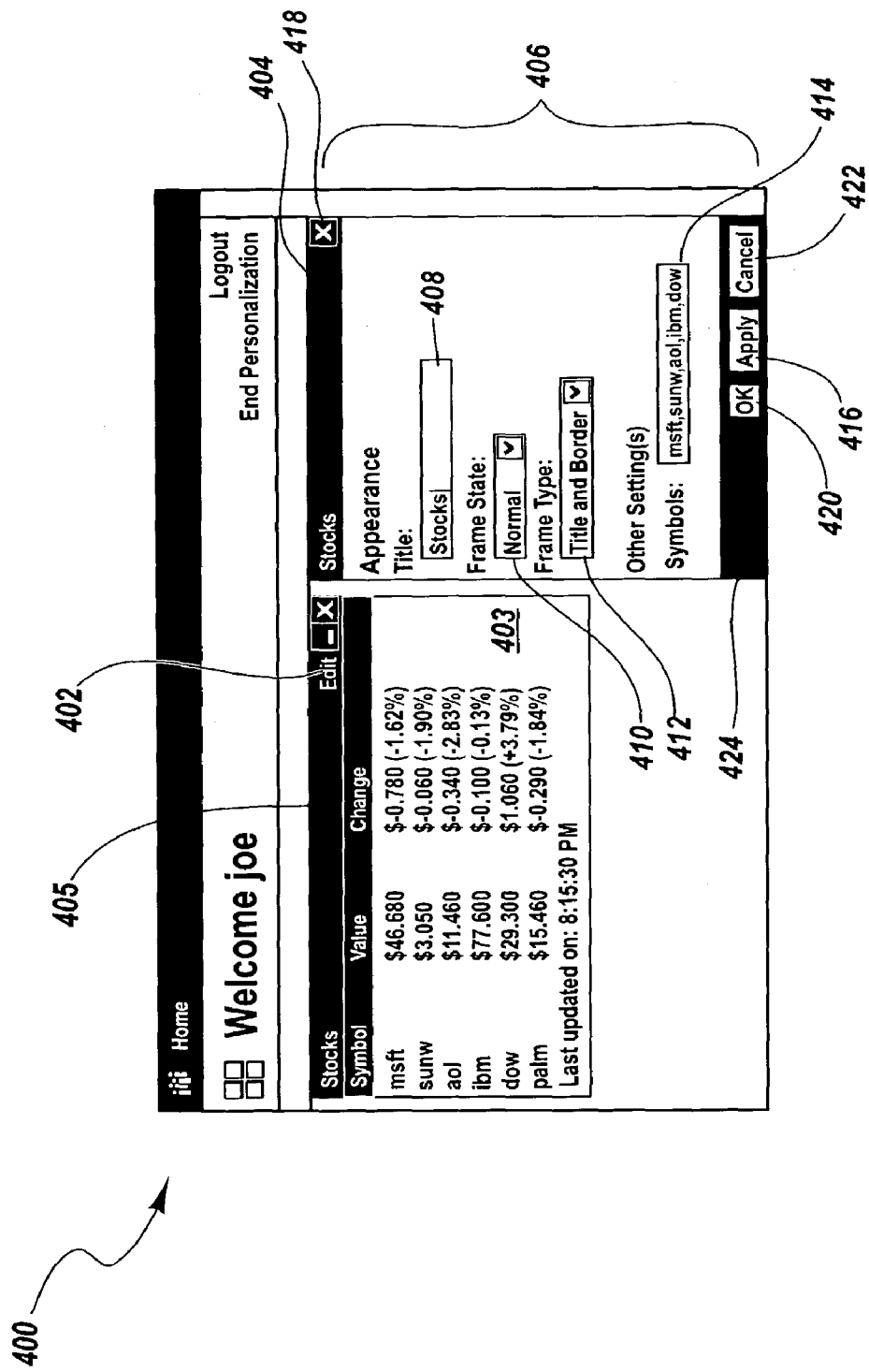
FIG. 4 illustrates an example of a user interface for personalizing web parts on the web page.

An example of personalization using personal settings is shown in FIG. 4, which generally shows a web page 400. By clicking on an edit link 402 in the web part 403, a user gains access to an editor part 404 within an editor zone 406. In the present example, the user is able to change the title 405 of the web part 403 by modifying text in the title text box 408. The user can modify the frame state through a frame state drop down menu 410 such that the web part appears in a maximized, minimized, or normal state. The user can also modify the frame type of the web part 403 through a drop down frame type menu 412.

In the present example shown in FIG. 4, the user can also add or remove stock values shown in the web part 403 by adding or removing a stock symbols from a Symbol text box 414. When the user is satisfied with the personalization selections, the user can select an apply verb button 416 that applies the changes to the web part 403 and closes the editor part 404. The editor part 404 further includes a number of other verb buttons including a close verb button 418, an OK verb button 420 and a cancel verb button 422. The close verb button 418 and the cancel verb button 422 perform the same action when invoked which is returning the web page 400 to a normal view mode not including the editor part 404 or editor zone 406 without making any of the changes to the web part 403 made by the user in the editor zone 406. The OK verb button 420, when invoked, makes the changes to the web part 403 specified by the user in the editor zone 404 and returns the web page to a normal view mode not including the editor part 404 or editor zone 406. A similar interface can be used in administrator customization scenarios or even in a web page developer building scenario.

Using the framework, a user may add additional web parts to a web page from a catalog of available parts. A web part known as a catalog part as shown in FIG. 5A and designated generally as 502, is used to add web parts to a web page 500.

The catalog part 502 may be disposed in a catalog zone 504. The catalog part 502 may have several catalogs 510 available for selection by the user. In one embodiment of the invention, a catalog may be selected by clicking on a catalog link 512. Clicking on a catalog link 512 causes a number of text boxes 506 to be displayed for selection of web parts to be added to the web page 500. By selecting available web parts through checking the text boxes 506 and then clicking an add button 508, web parts are added to the web page 500. The catalog zone 504 may be used by both individual web page users to personalize selections for their view of the web page, or by web page developers or administrators in a customization scenario to create views available to all users of a particular web page.

Figures 5A, 5B:
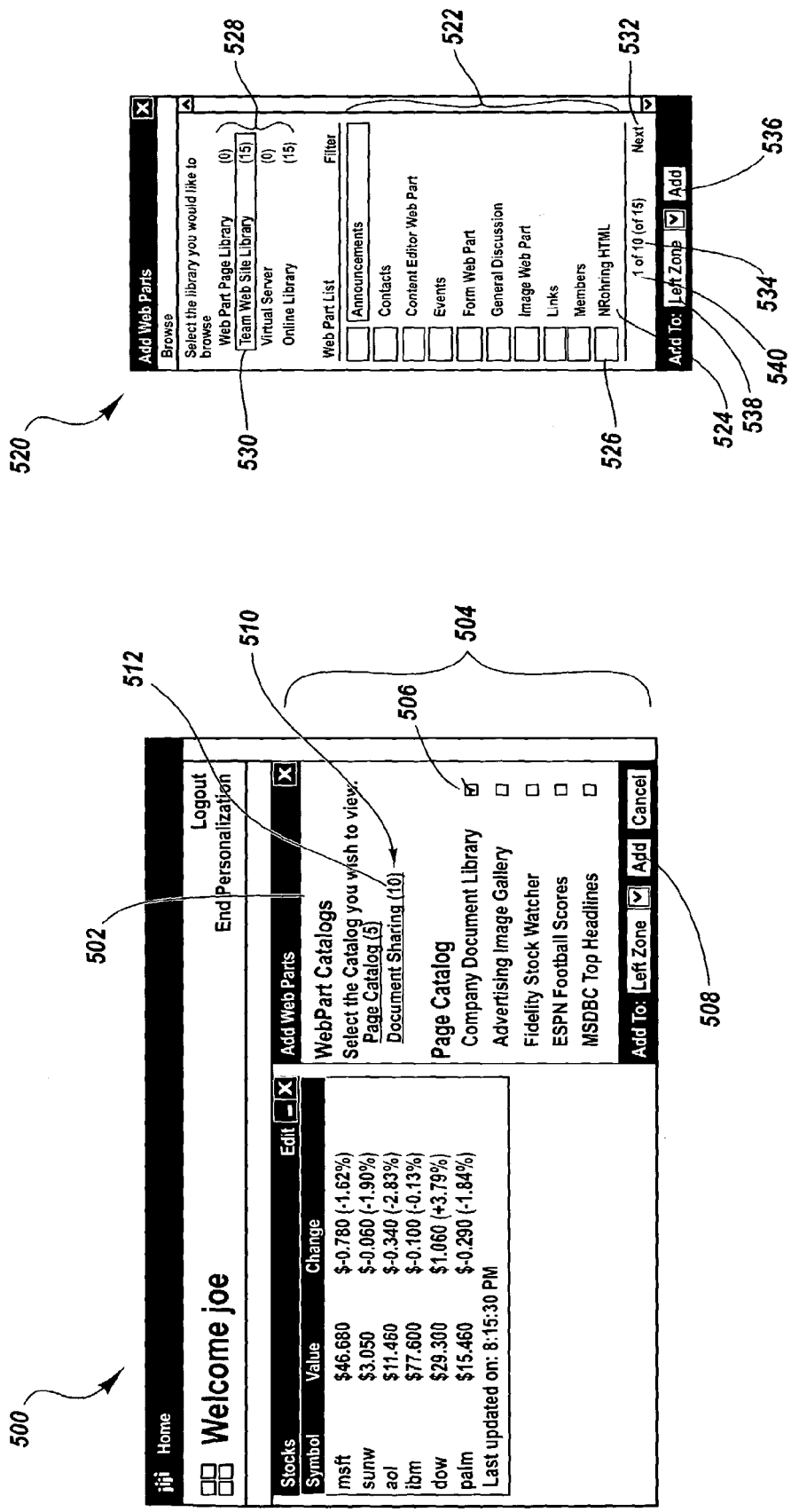
FIGS. 5A and 5B illustrate examples of user interface for adding web parts to a web page.

Referring now to FIG. 5B, yet another example of a catalog part is shown. The catalog part 520 includes representations of a selection of web parts 522 available to be added to the web page. Each of the representations of the web parts include a web part title 524. The web part title 524 is preferably the title that is displayed when the web part is displayed on the web page such as the title 112 shown in FIG. 1. The representations of the web parts further include a part icon 526. The part icon 526 is a graphical file that represents the web part in this example.

The catalog part 520 may further include a list of libraries 528 available within the particular catalog part 520. Each of the libraries in the list of libraries 528 is selectable, such as in one embodiment by clicking on a library link 530. This causes the selection of web parts 522 associated with the selected library link 530 to be displayed.

The catalog part 520 also has the capability to divide the display of the selection of web parts 522 among several different pages. Page links 532 are provided to link between the various pages displaying the selection of web parts 522. An items-per-page indicator 534 shows a representation of the number of web parts available for addition to the web page along with a numerical representation of the page, and number of items per page, of the selection of web parts 522 currently being displayed on the catalog part 520.

The catalog part 520 further includes a drop down selection box 538 for choosing to which zone on the web page an added web part will be added. Once a user has made a selection of a web part to add to a web page and chosen where to place the new web part, the user selects the add verb 536. This causes the catalog zone to invoke an add function, which causes the newly added web part to be added to the appropriate zone. The newly added web part is also registered with a web part manager that functions to coordinate the interaction and layout of web parts.

In an illustrative example, a web part may be added to the web page using a catalog part such as catalog part 520. The catalog zone to which the catalog part 520 belongs will call an add method associated with the selected catalog part 520 when the add verb 6 is invoked. The catalog part 520 should then call the web part managers add method to add the web part (one of 522) to the page. The added web part (one of 522) will be tracked by the web part manager.

The web part framework allows web parts to communicate information to other web parts over pre-defined interfaces or connections. These connections can be defined on the page or created through personalization. Any two web parts that talk over the same connection interface can be connected. Further, using transformers, as described later, communication of web parts with different connection interfaces can be implemented. This allows arbitrary web parts to share data, even when they were designed and implemented independently.

Figure 6:
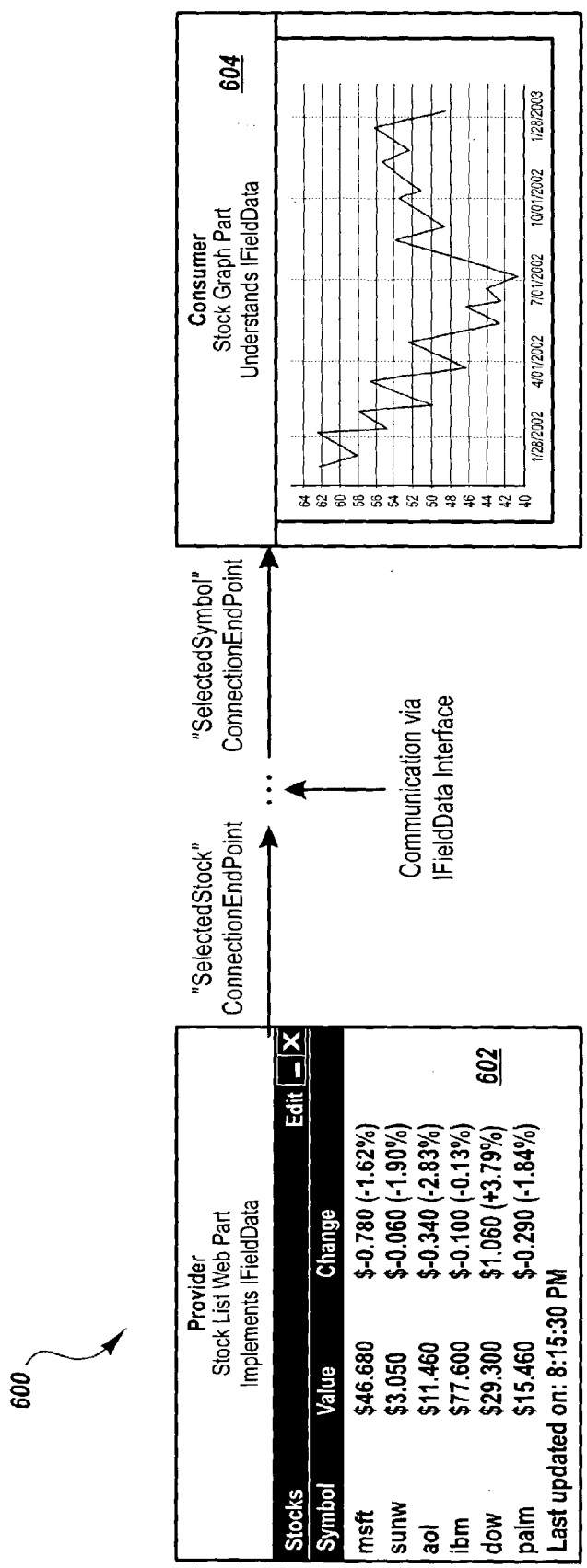
FIG. 6 illustrates connections between two web parts on a web page.

Referring now to FIG. 6 an example of two connected web parts is shown. FIG. 6 shows a stock list web part 600 that displays a list of selectable stock symbols. The stock list web part 600 implements an interface (illustrated in this example as an IFieldData Interface) to expose a currently selected stock 602. A stock graph web part 604 is able to graph historical data based on any stock symbol. The stock graph web part 604 is able to communicate over the interface. Each web part registers connection end points with the web part manager, which helps to coordinate the different web parts that appear in different zones of the web page, so that connections can be established. Once connected, the two parts 600 and 604 provide an end user experience where a user can quickly flip through their favorite stocks and see a related graph.

The web part framework also includes functionality that allows export and import of personalization settings for end users or customization settings for system administrators. For example, when a user sets a personalized view using the editor parts described above, the settings may be exportable such that other users can use them to set the properties of their particular view of a web portal. This functionality can be accomplished as will be explained in more detail below in one embodiment by exporting and importing an xml file.

While the above discussion has set forth various features and advantageous properties of various embodiments of the invention in a broader overview sense, attention is now directed to the following discussion that sets forth various base classes and classes that may be included in the web part framework for creating the web parts and zones that appear on the web page. Using the various base classes and classes, a web page developer can create a modular, customizable and personalizeable web page.

One embodiment of the web part framework described herein includes three general groups of base classes from which other classes and controls derive. These general groups of base classes include part controls, zone controls, and the web page manager. Generally, the part controls include the functionality of each of the individual web parts. Examples of such parts include the web parts, editor parts, and catalog parts previously described. The zone controls include the functionality required to organize web parts and to render a user interface around each part.

The web page manager is a non-visual class that, among other things, helps to coordinate which parts are contained in which zones and to facilitate the connections between various web parts. The web page manager also can render a web page in different modes. For example, to enable the use of the editor web parts, the web page manager renders the web page in an edit view mode. To use catalog web parts, the web page manager can render the web page in catalog view mode. To customize the web page, the web page manager renders the web page in a customization view mode that is similar to the edit view mode.

Part Controls

Figure 7:
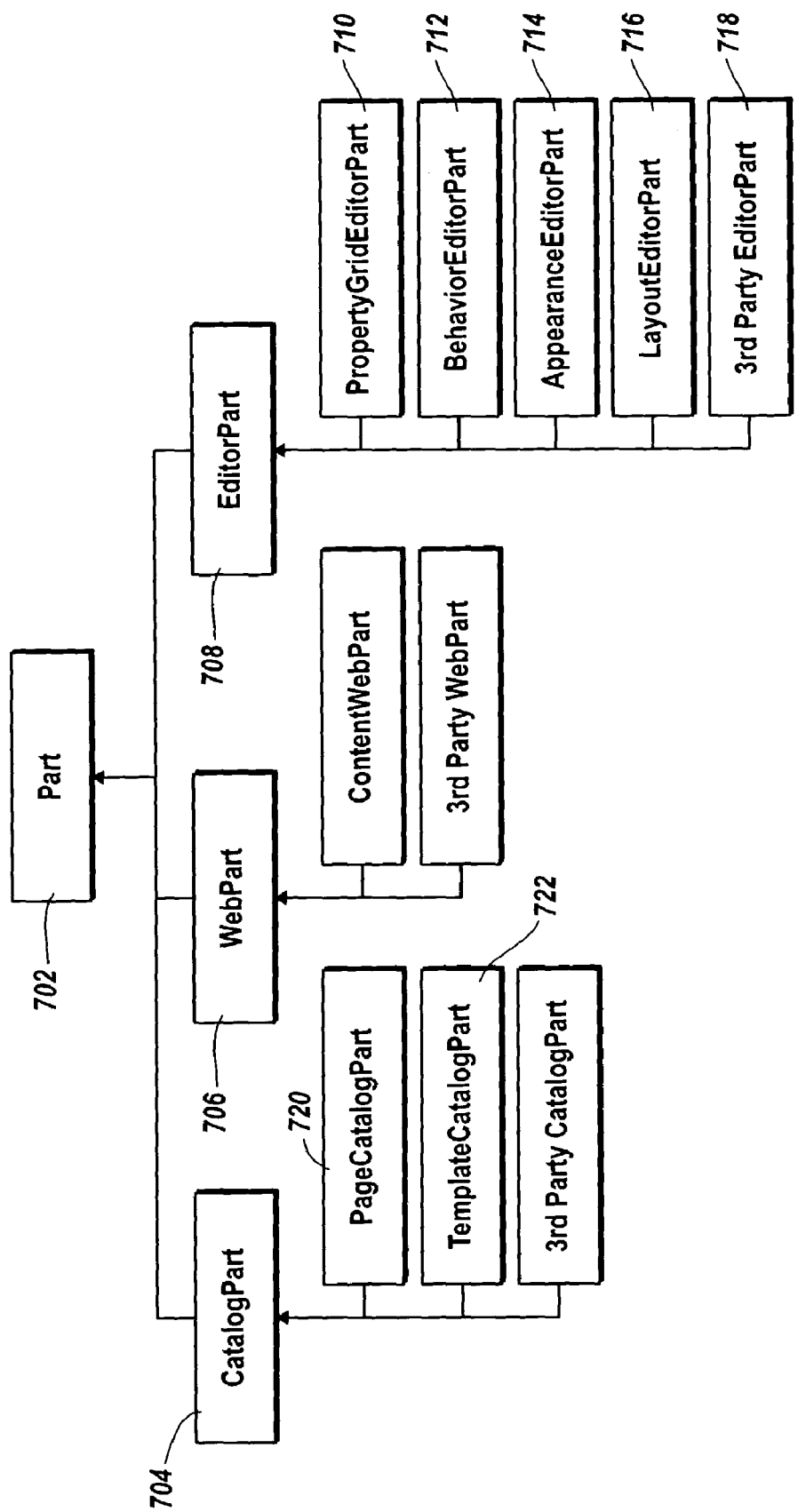
FIG. 7 illustrates a hierarchy of classes and base classes used in a web page creating framework.

Referring now to FIG. 7, a more detailed description of the functionality of the part controls will be set forth. The part controls typically depend from the "Part" base class 702. Depending can also be described in this specification and by those skilled in the art as deriving or inheriting. Depending from the part base class 702 are three other base classes, namely the catalog part base class 704, the web part base class 706, and the editor part base class 708. The structure of the base classes is hierarchical such that a base class or class that depends from another base class includes all of the functionality of the base class from which it depends plus some additional designed functionality. For example, the part base class 702 can be used to create part controls for all modular classes because it is the highest in the hierarchy. The web part base class 706 can be used to create modular classes using all of the functionality of the Part base class 702 plus controls for classes with advanced functionality. The editor part base class 708 can create modular controls using the functionality of the Part base class 702 plus modular controls which set associated control properties. In other words, the editor part base class 708 can be used to personalize other web part base classes 706. The catalog part base class 704 is a base class used for a control that acts as a catalog. In other words, the catalog part base class 704 includes catalog part base classes that allow for the addition or removal of other web parts when a web page is rendered. These classes can be created using the functionality of the part base class as well as other specialized functionality designed for the catalog part base class. Each of base classes, The catalog part base class 704, the web part base class 706 and the editor part base class 708, have other classes that derive or inherit from them as shown in FIG. 7.

Within each of the base classes and classes are properties that enable some of the functionality of the base class or class. The part base class 702 includes the following properties: Description, FrameState, FrameType, LargeIconImageUrl, Roles, SmallIconImageUrl, Title, and TitleStyle.

One of the properties available in the part base class 702, and hence all other classes that inherit from the part base class 702, is the description property. The description property is a web part description that may be used by other web parts. For example as explained below, the description property may be used by a catalog part or as a tool tip in a title bar. The description property is not personalizeable by an end user or customizable by a system administrator after it has been set by a developer in the construction of the web page. An example of the description property may be seen in the sample code provided in conjunction with the description of FIG. 1 above.

Another property in the part base class 702 is the FrameState property. The FrameState property defines the frame state of the part. For example, the FrameState property can define if the particular web part is minimized, maximized or normal. When a web part is minimized, only the title bar is displayed. When a web part is normal, the title bar and the part content is displayed. The FrameState property is personalizeable by end users and customizable by system administrators.

Yet another property in the part base class 702 is the FrameType property. The FrameType property determines the type of chrome that will frame the part. For example, the FrameType property can be set such that the title only is displayed, the title and the border are displayed or a border only is displayed.

Still yet another property of the Part base class 702 is the LargeIconImageURL property. This property includes the URL of an image representing the particular web part and the image is sometimes referred to as a part icon. These icons may be used as a graphical representation of the part. As described above in conjunction with the description of FIG. 5B, the LargeIconImageURL property may be used by the page catalog part to show a graphical representation of web parts that are available to be added to a web page. This may also be included the title area of the particular web part. This property is not personalizeable by the end user or customizable by a system administrator. Similar to a LargeIconImageURL property is a SmallIconImageURL property. This property describes the URL of an image representing the particular web part in a manner similar to the LargeIconImageURL but where the URL links to an image that is smaller in size.

Yet another property of the part base class is the Roles property. The Roles property allows the web page developer to set the roles that the particular web part is available to. For example, a web part could offer site administrative functionality such as in a customization scenario to all users who are in an open "Admin" role.

Yet another property available in the Part base class is the Title property. The value of the Title property will be rendered as the title that appears at the top of the web part above the content. This is usually the combination of text and captions within the Title property string. In a preferred embodiment of the invention the Title property should be used as the alternate text when the part icon property described above in connection with the LargeIconImageURL and SmallIconImageURL is rendered to the client.

Web Part Base Class

The web part base class 706 illustrated in FIG. 7 depends from the part base class and includes all the properties and functionality of the part base class in addition to other properties that will be herein defined. For example, the web part base class 706 includes a Connections property. The Connections property describes the connections associated with this web part. An example of the use of the connections property is described above in the description of FIG. 6 and will be described further herein in the description of the web part manager base class.

Yet other properties available to the web part base class 706 include the HelpURL and WebPartHelpMode properties. The HelpURL property can be set to the URL of a page which offers help about the particular web part. The WebPartHelpMode property defines how the link should be displayed. For example, the link may be displayed as a modal dialogue (or a new browser window if modal dialogues are not supported). The link may be displayed as a modeless dialog (or new browser window if modeless dialogues are not supported). The link may be displayed such that the current window is used to navigate to the help URL.

Still another group of properties that exist in the web part base class 706 is the group of part properties known as the "allow" Properties. These properties allow web page developers to decide what functionality is permitted in a particular web part. For example, the AllowClose property allows the web page developer to determine if the particular web part is allowed to be closed (i.e. removed from the zone). This property is generally personalizeable by all users. The AllowHide property allows the web page developer to define if the particular web part is allowed to be hidden (i.e. no visible elements, but still included in the zone). This property is generally personalizeable or customizable by all users. The AllowMinimize property determines if the particular web part is allowed to be minimized (only the title bar shown on the web page). This property is personalizeable or customizable by all users. The AllowMove property determines if the web part is allowed to be moved within a zone, or between zones. This property is not personalizeable or customizable. An AllowExport property determines if the particular web part property setting may be exported.

The web part base class 706 also includes an AllowPersonalization property. In this way, if a page developer wishes to disable personalization for a given web part the property can be set to false. For example, while some properties are personalizeable in the general sense, if a web page developer chooses to remove these personalizeable attributes, this can be done by simply setting the EnablePersonalization property to false. As such end users and system administrators are not be allowed to edit the particular web part for which this property has been set.

The web part base class 706 also includes a Caption property. This property defines the string that is added to the end of the title in the chrome of the web part. This property is intended for document names or other context specific information. The property is expected to be dynamic, unlike the Title property which is expected to remain static. Another property included in the web part base class 706 is the direction property.

Another property available in the web part base class 706 is the Hidden property. The Hidden property determines if the particular web part is visible on the web page. Parts that have the Hidden property set to false are considered hidden. In one embodiment, these parts are instantiated and go through the pre-render and render phases. However, the zone does not show their content on the web page. Nonetheless, hidden parts can participate in connections. Hidden parts will be hidden when the web part manager is in normal or design mode, as will be discussed in the section of this specification describing the web part manager in more detail below. When the web part manager is in edit mode such as in customization or personalization scenarios, hidden parts are typically visible to allow for personalization.

If the Visible property of the web part base class 706 is set to false, the web part is considered closed. Web parts with the Visible property set to false are instantiated on the page, but do not go through the rendering phases of the lifecycle (pre-render and render). If a web part is closed, it cannot participate in connections or other communications.

The Display property of the web part base class 706 determines if the web part is visible in a web page browser. Even if the Display property is set such that the web part is not visible in the browser, the particular web part still goes through the render phases. This property is personalizeable on a per user basis. The EditURL property of the web part base class 706 contains the URL of an HTML file that can be used to edit the particular web part. This property is customizable and personalizeable by all users.

The editor parts property of the web part base class 706 sets forth the set of custom editor parts associated with the web part. The editor part base class 708, from which the custom editor parts depend, depends from the Part base class 702 and is described in more detail below. This property is not customizable or personalizeable in this example.

The IsShared property of the web part base class 706 indicates if the particular part is shared between multiple users or if it is only available to the current user. This property is not customizable or personalizeable. The MissingAssembly property of the web part base class 706 contains the text which is displayed when the user attempts to add a web part that exists in an assembly that is not installed on the web page server. This property is not customizable or personalizeable. The TitleURL property of the web part base class 706 includes a URL to an HTML document that contains supplemental information regarding the particular web part. This link appears in the title bar of the frame if it is specified. This property is customizable and personalizeable by all users. The Verbs property of the web part base class 706 sets forth a set of verbs (OK, Apply, Close, Maximize, Minimize, etc) associated with the particular web part. This property is not customizable or personalizeable.

The web parts are generally, although not always, rendered in a zone. The zone property of the web part base class 706 sets forth the web part zone that contains the web part. This property is not customizable or personalizeable. The ZoneID property of the web part base class 706 sets forth the ID of the zone that contains the particular web part. This property is customizable and personalizeable. The ZoneIndex property of a web part base class 706 sets forth the index of the web part in the zone relative to other web parts in the zone.

In addition to properties, certain classes also include methods. A method is a way of invoking the functionality of the class. The methods also include information about how to offer the functionality of a particular class to other external components or classes. The web part base class 706, for example, includes a GetConnectionInterface method. This method is a helper method so that consumers, which are web parts that receive information from other web parts, can query providers, web parts that provide information to other web parts such as consumer, for additional connection interfaces. This method contains the logic to traverse the connection objects like transformers, which are discussed in more detail below.

The web part base class 706 further contains an OnEditModeChanged method. This method is called when a particular part enters or exits edit mode. This part is added as a convenience to part developers who want to hook onto the web part manager.

Further defining the functionality of a particular class are enumerations. Enumerations are special data types to set property values. When an enumeration exists for a property, a user interface can be constructed including drop-down menus for selection of the property value. For example on the web part base class 706, one enumeration is the WebPartHelpMode. This enumeration describes how the help URL for the part should be treated. There are three values that can be selected for the WebPartHelpMode enumeration. These include, modal, modeless and navigate. If this particular enumeration is set a modal, the help URL should be shown in a modal window. If this enumeration is set to modeless, the help URL should be shown in a modeless window that will stay active or visible on the user's screen until explicitly dismissed. If this enumeration is set to navigate, then the entire page will be navigated to the help the URL.

Another enumeration in the web part base class 706 is the part FrameType. The art FrameType enumeration is used by both the web part and zone controls to describe the frame that is applied around each web part as part of the user interface. In this example, this enumeration can have one of five values including none, title only, title and border, border only and default. If the value is set to none, no frame is displayed around the web part. If the value is set to title only, only the title bar is shown on the web part. If the value is set to title and border, both the title bar and border are rendered. If the value is set to border only, only the border is rendered, and no title bar is rendered on the web part. If the value is left on the default, the frame type should be taken from the enclosing zone. An example of an implementation of the PartFrameType enumeration is shown in FIG. 4 as the FrameType drop down menu 412.

Another enumeration available in the web part base class 706 is the part FrameState enumeration. This enumeration is used by both part and zone controls to describe the state of the web part. In this example, three values are available for this enumeration, namely the normal, minimized or default.

If the value is set to normal, a normal window shown. If the value is set to minimized, just the title bar is displayed. If the value is set to default, on the web part the frame style should be taken from the enclosing zone. On a web part, if the default value is used, the standard frame styles should be used. An example of an implementation of the part FrameState enumeration is shown in FIG. 4 as the Frame State drop down menu 410.

Editor Part Base Class

Another class that depends from the part base class 702 is the editor part base class 708 as illustrated in FIG. 7. The editor part base class 708 includes functionality beyond that of the part base class 702 including certain properties and methods that are particular to the editor part base class 708. An editor part can be associated with any single web part that it can be used to edit. The controls of the editor part are used to "edit" the web part through a user interface.

One property available on the editor part base class 708 is the AllowMinimize property. This property specifies if the editor part may be minimized. Another property available in the editor part base class is the WebPartToEdit property. This property is a reference to the control for which the editor part is responsible. Yet another property that exists in the editor part base class is the Display property. This property indicates if the editor zone should display this part. For example if an editor part has no user interface for the current WebPartToEdit, it would set this to false so that the particular editor part is not displayed.

The editor part base class includes at least two methods. One method is the ApplyChanges method. The ApplyChanges method is called by the zone when the editor part should apply values to its associated web part. The value of true indicates that the save was successful, and the value of false returned indicates that an error occurred. Another method available in the editor part base class is the SyncChanges method. This method is called by the zone when the editor part should synchronize its values because other editor parts may have changed control properties of the web part associated with the editor part. This is usually called after all of the applied changes by the other editor parts have returned successfully.

A number of classes derive from the editor part base class including a PropertyGridEditor part 710, a BehaviorEditor part 712, an AppearanceEditor part 714, a LayoutEditor part 716 and various third-party editor parts 718.

Deriving from the editor part base class is a PropertyGridEditor part class 710. The PropertyGridEditor part 710 is an editor part that displays properties marked as web browsable. The PropertyBrowserEditor part class 710 can render different user interfaces for each property based on the type of the property. The default user interface would be a text box which is used in conjunction with a type converter to set the controls property value. The user interface for the different property types may be as follows. For a string property type, the rendered user interface may be a text box. For an integer, floating point number or unit, the rendered user interface would also be a text box. For a Boolean properties type, the rendered user interface may be a check box, a radio button, or a drop down. For an enumeration, the rendered user interface may be a drop down of enumeration values. For a DateTime property type the rendered user interface may be a text box or calendar. For color, the rendered user interface may be a text box, a drop down, or a color picker.

A control derived from the editor part base class does not need to specify which type of user interface is offered by the PropertyGridEditor part control 710. Instead it is automatically determined by the editor part. Additionally, the PropertyGridEditor part control 710 includes several properties that allow the page developer to indicate the preferred user interface rendering for common types. For example, when the property type is conducive to the use of a check box or a radio buttons, properties within the PropertyGridEditor part control 710 allow for selection by the page developer as to which type of user interface will be used.

The PropertyGridEditor part control 710 also includes several style properties to adjust the look and feel of an editor part. One set of style properties is centered on the text formatting and includes the properties: PropertyNameStyle, PropertySetterStyle, and ErrorStyle. In addition, a style is available for controlling the look of the table which is used to organize the property names and their associated setter user interface. The style of this table can be controlled using the GridStyleProperty. For example, a user could configure the editor part to render lines around the grid. This style will be applied to the outer table which wraps the property name and setter user interface.

Some of the properties that can be specified in the PropertyGridEditor class concern the user interface that is displayed for making various selections. These properties include a default value, but may also include other acceptable formats. The BoolEditorType property of the PropertyGridEditor part class determines which type of setter user interface is used for Boolean properties. The default type is a checkbox, but a radio button or drop down may also be used. The ColorEditorType part determines which type of setter user interface is used for color properties. The default type is a drop down, but as noted above, a color picker or a text box may also be used. The DateEditorType property of the PropertyGridEditor part determines which type of setter user interface is used for date properties. The default for this type is a text box, but a calendar or other suitable interface may be specified as well. The UnitEditorType of the PropertyGridEditor part class 710 determines which type of setter user interface is used for unit properties. The default for this property is a text box.

The WebPartToEdit property of the PropertyGridEditor part class 710 references to the web part for which the editor part is responsible for. This property can be used by the editor part to adjust properties on its associated control.

The Display property of the PropertyGridEditor part class 710 indicates if the editor zone should display this part. For example if an editor part has no user interface for the current WebPartToEdit, the Display property would be set to false so that it is not displayed. The GridStyleProperty of the PropertyGridEditor part determines the table style applied to the grid of available properties.

The PropertyGridEditor part base class 710 also includes various methods that are available to it. The ApplyChanges method of the PropertyGridEditor part base class 710 is called by the editor zone when the editor part should apply values to its associated control. This message method will be called by the editor zone that is hosting the editor part when the "OK" or "apply" verb is invoked in the editor zone to indicate that any changes should be saved. The editor part can return false if an error occurred and the editor zone will behave appropriately. For instance, if the OK verb is clicked the editor zone would normally set the page into a normal mode after calling ApplyChanges. But if an error occurs the editor part would remain visible so that the error can be corrected. A True value returned indicates that the save was successful.

The PropertyGridEditor part can encounter two different types of exceptions. The first type of exceptions is exceptions thrown by the editor part itself while trying to convert a string into the property data type. For convenience these exceptions are referred to as conversion exceptions. The second type of exceptions is exceptions thrown by the property set method of the web part or some layer below, like the database.

The PropertyGridEditor part will display a generic error message at the top of the grid of settable properties. This error text can be set through the ErrorText property. A string replacement can be done substituting the name of the first property that caused an error. The PropertyGridEditor part will display friendly conversion error messages by catching and fixing up exceptions where Convert routines are called. Such string replacements may include: "This property requires a numeric value" or "This value is out of range" or "This property requires a value greater than or equal to 0" or "This property requires an integer value" or "This property requires a web address" or any other appropriate message for the property being set.

For errors that the web part throws, the framework will display the exception message as it is. As such, the web part developer can fix the error message to some friendly format instead of a standard exception message. In one embodiment of the invention, properties that are prone to cause errors when using a TypeConverter are not marked as WebBrowsable. Instead a custom editor part is provided to set the property.

The SyncChanges method of the PropertyGridEditor part is called by the editor zone when the editor part should sync its values because other editor parts (i.e. a web part's associated control) may have changed control properties. SyncChanges is only called after the ApplyChanges methods have returned successfully from all editor parts. As such, the SyncChanges method will not be called if any of the ApplyChanges methods return false, indicating that an error has occurred.

The AppearanceEditor part base class 714 depends from the editor part 708. The AppearanceEditor part base class 714 sets common user interface web part properties such as title, size and frame type. An example of an AppearanceEditor part rendered by the AppearanceEditor part base class 714 is shown in FIG. 8A and designated generally at 800. The LayoutEditor part base class 716 depends from the editor part base class 708. The LayoutEditor part base class 716 sets web part layout properties such as for zone, ZoneIndex, Hidden etc. An example of a LayoutEditor part rendered by the LayoutEditor part base class 716 is shown in FIG. 8B and designated generally at 802.

The BehaviorEditor part base class 712 depends from the editor part base class 708. The BehaviorEditor part base class 712 sets behavior properties including AllowClose, AllowMinimize, AllowExport, EnablePersonalization, TitleURL, EditURL, HelpURL and Description. A BehaviorEditor part is available when the web page is being modified for all users or when editing a part that is not shared between multiple users. This is because certain properties such as AllowClose are applied to all users and should not be set on a per user basis. An example of a BehaviorEditor part rendered by the BehaviorEditor part base class is shown in FIG. 8C and designated generally at 804.

Other editor parts such as customizable third-party editor parts may be associated with various web parts. Web parts that offer these custom editor parts expose them through their editor parts property. Part developers who wish to provide custom editor parts can override the editor parts property of a particular web part. This property will be checked by the EditorZone when a given part enters edit mode.

Catalog Part Base Class

The catalog part base class 704 depends from the part base class 702. Catalog parts are parts that expose user interfaces that allow users to add new web part instances to the web page. Catalog parts are linked directly with the web part manager to indicate that a control should be added to the page on a per user basis. Catalog parts are rendered by a catalog zone. Two catalog parts that depend from the catalog parts base class are shown in FIG. 7 as PageCatalog part 720 and TemplateCatalog part 722. Third part catalog parts can also be used.

The PageCatalog part 720 displays web parts which have been closed. Closed is defined as any part which has a visibility set to false. When a part is added from a catalog it is no longer be available in the catalog. In general a catalog will start off empty and be gradually filled with parts that have been declared in a persistence format and have been closed. A catalog does not typically allow any web parts to be statically declared within the catalog.

The TemplateCatalog part 722 is used to create catalogs declaratively. Web parts contained in a <CatalogTemplate> can be added to the page. Multiple copies of the same catalog item declared by a TemplateCatalog part may be added to the page.

The classes that depend from the catalog part controls give functionality to the catalog part base class 704. Examples of this functionality can be seen by examining FIGS. 5A and 5B, which generally shows CatalogWebParts 500 and 520. The catalog part base class 704 includes controls for including a selection of web parts 522. The catalog part controls can also be used to select the appropriate part icon 526 to display the parts in the catalog part 500 and 520. The catalog part controls further include controls for showing part descriptions. Also included are controls to show pagination 540, items per page 534, check box style, part description style, part images style, part title etc.

Two public properties exist in the catalog part base class, AvailableParts and web part manager. The AvailableParts property, which is a property of the Part base class, indicates the parts available within a catalog for display by the catalog part 800. The AvailableParts property may be dynamic such as on a web service that has a changing set of available web parts. Because the catalog part relies on methods contained in the web part manager to add selected items to the page, each catalog part contains a reference to its web part manager. This is a protected member on the class and has been included to aid extensibility.

Several private properties exist as well including SelectedParts, ShowPartImage, ShowPartDescription, ShowPartTitle, PartTitleStyle, PartDescriptionStyle, PartImageStyle, CheckBoxStyle, Paginate, ItemsPerPage, PagerStyle. These properties aid in the rendering of the catalog part by helping to define the look and feel of the catalog part.

An Add method exists that specifies where particular added web parts are added to the web page. The CatalogZone will call the Add method on the selected catalog part when the add verb is invoked. The catalog part will then call the web part manager's Add method to add the web part to the page. After that point the web part will be tracked by the web part manager.

Another class that derives from the Object base class is the WebPartVerb class. WebPartVerbs are used to define user interface elements rendered by zones which invoke a specific action. The click event can be handled on the client or on the server. Verbs are designed to be rendered in a menu, however they can also be rendered as an image, button, or link. The properties that exist in the WebPartVerb class include Checked, Description, Enabled, ImageUrl, OnClick, The Checked property defines if the verb for which it is called should have checker user interface displayed. In a menu user interface environment a check would appear next to the verb text. The Description property contains a string that is a description of the verb. This string could be displayed in a tool tip. The Enabled property determines if the particular verb is enabled. If a verb is not enabled, a menu could display it greyed out or not at all. The ImageUrl property defines the location of an image that is associated with the verb. The OnClick property is the event handler that receives the server side click event. The OnClientClick property is the client side function that is be called when the particular verb is clicked. The Text property is the text name of the verb. This text is displayed as the menu text. The Visible property defines whether or not the particular verb is visible.

In addition to the properties defined above, the WebPartVerb class also includes an Invoke method in this example. The Invoke method is the method that fires the click event for the particular verb for which it is defined.

Also deriving from the Object base class is the WebPartEventArgs class. The WebPartEventArgs class is used with WebPartVerbs to indicate the web part that is associated with the WebPartVerb which has been invoked. This class includes a web part property that defines the web part associated with the WebPartVerb that has been invoked.

Zone Controls

Figure 9:
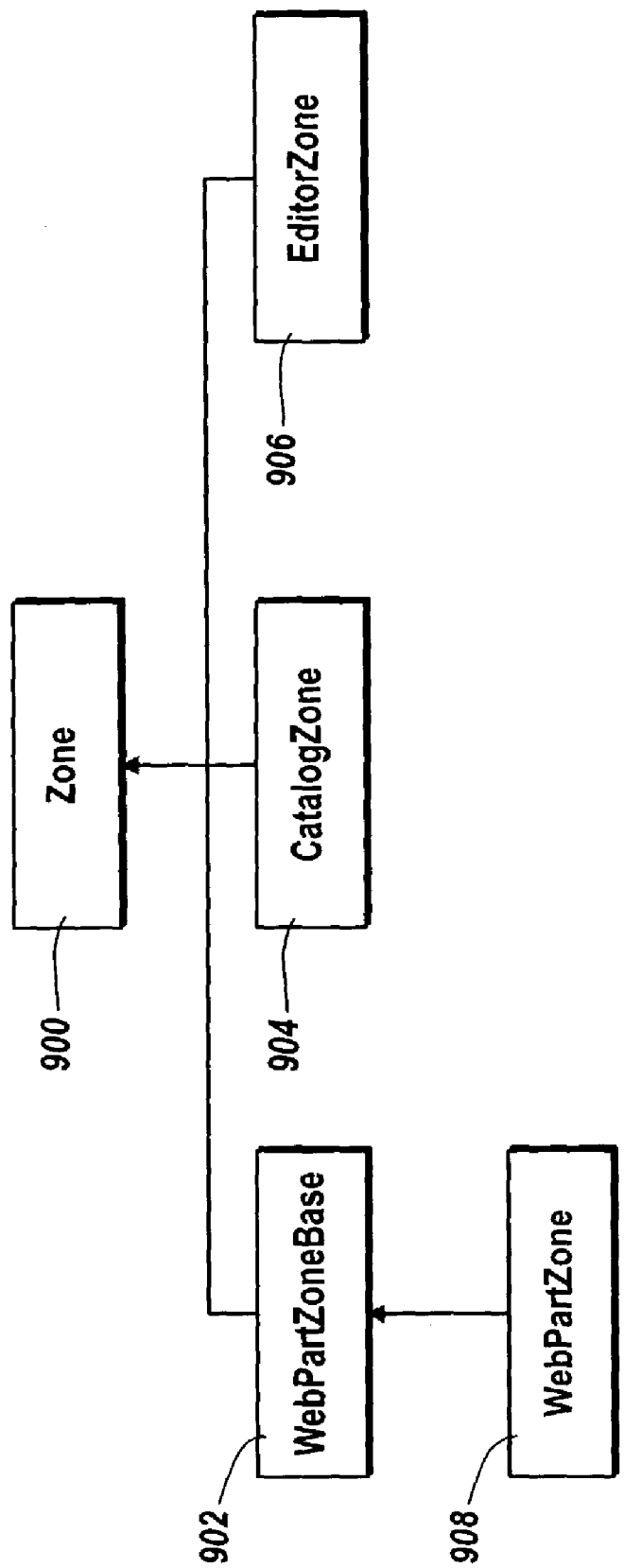
FIG. 9 illustrates a hierarchy of classes and base classes for zone controls used in a web page creating framework.

The zone base class is used to create parts to arrange part controls in a consistent fashion. For example, zones are responsible for rendering the chrome and user interface which surrounds each part that is associated with that particular zone. Referring now to FIG. 9, a hierarchy of zone controls is shown. The zone base class 900 has three base classes that derive from it. These three base classes are the WebPartZoneBase base class 902, the EditorZone base class 904 and the CatalogZone base class 906. The zone base class 900 is used to control the layout of all controls that inherit or derive from the part base class 702. The WebPartZoneBase class 902 is used for web part controls. The EditorZone base class 906 is used to layout editor part controls. The CatalogZone base class 904 is used to layout catalog part controls.

Figure 10:
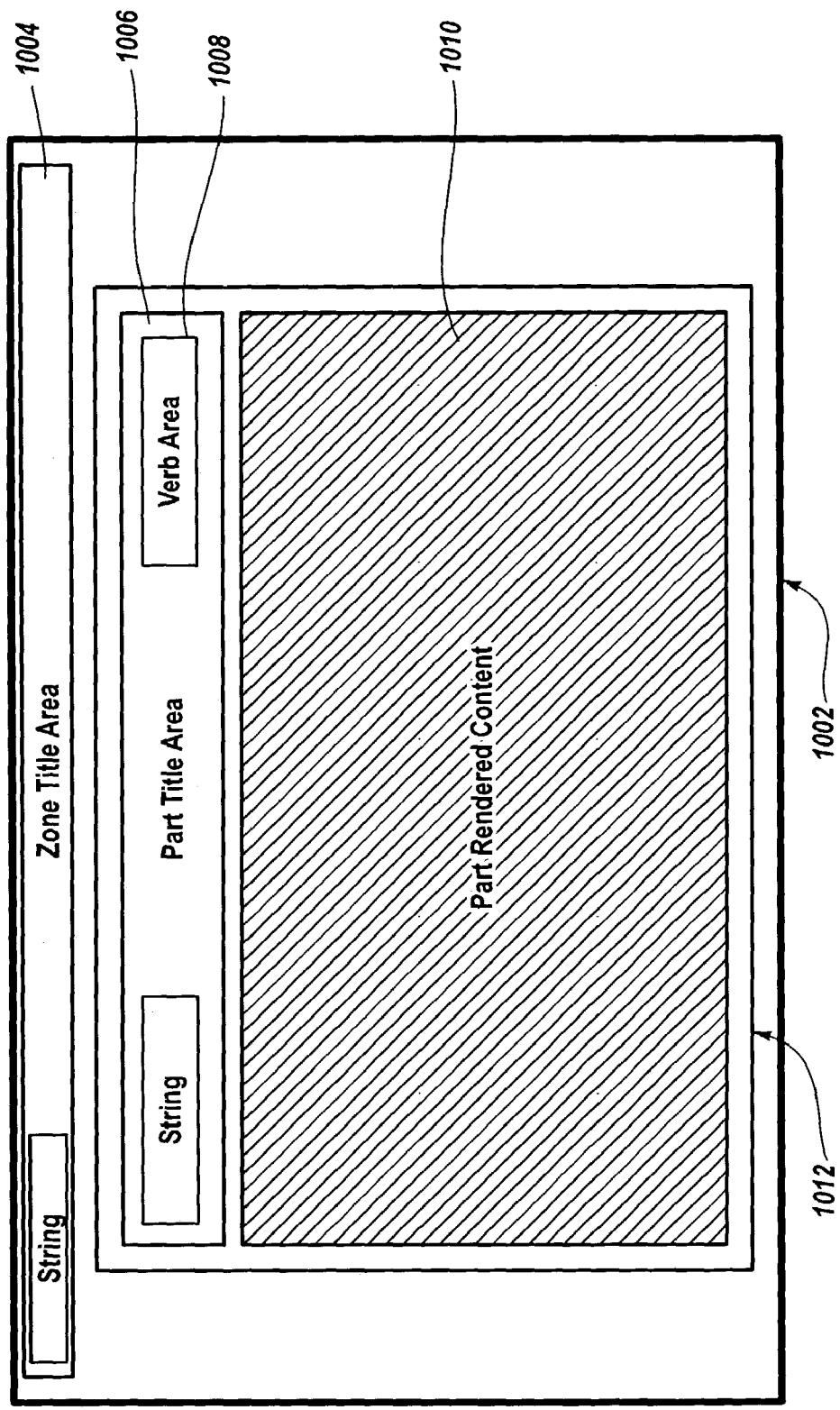
FIG. 10 illustrates a zone layout and web part layout that can be accomplished using one embodiment of the invention.

FIG. 10 illustrates various user interface that can be rendered by the zone. Using FIGS. 9 and 10, various properties associated with the zone base class and the classes that derive from the zone base class will be described. Some of the properties belonging to the zone base class 900 can be used to define how a particular zone will be rendered on the web page. These zone base class properties include BackImageURL, FrameType, Title, TitleStyle and TitleHorizontalAlign. Some of these properties can be set through enumerations in a manner previously herein described.

The zone base class 900 includes a BackImageURL property that defines the URL of an image that should be used as the background of the particular zone.

The FrameType property of the zone base class 900 is used to specify how the zone renders the title bar and border around the particular zone in the edit, catalog and design modes. For example, referring to FIG. 10, specifying a FrameType value of none causes the zone to render neither a zone frame 1002 nor a title bar 1004. Specifying a FrameType value of TitleOnly causes the title bar 1004 to be rendered but not the zone frame 1002. Specifying a FrameType value of TitleAndBorder causes both the title bar 1004 and the zone frame 1002 to be rendered. Specifying a FrameType value of BorderOnly causes only the zone frame 1002 to be rendered. The FrameType property can also be expressed as an enumeration as described in more detail above.

The zone title bar 1004 can be controlled through various other properties of the zone base class 900. For example, the TitleStyle property may be used to specify the style for the title bar 1004. As such, the TitleStyle defines such things as foreground color and background color. The Title property of the zone base class 900 contains a string value representing the title of the zone. The TitleHorizontalAlign property of the zone base class 900 defines the alignment used for the title of the zone.

Additionally the zone base class 900 contains several properties for defining the characteristics of any web part contained within the particular zone. For example, the properties PartStyle, PartFrameType, PartTitleHorizontalAlign, PartTitleStyle, PartVerbStyle and PartContentStyle are used in a fashion similar to the properties used to control the rendering of the zone components to render components of the web parts that reside within a zone. Referring to FIG. 10, the part title area 1006, the part verb area 1008, the part rendered content 1010, the part frame 1012 and various other components are controllable by setting the values of the above properties.

WebPartZoneBase Class

Deriving from the zone base class 900 is the WebPartZoneBase class 902. The WebPartZoneBase class 902 is designed to host web part controls. The WebPartZoneBase base class 902 includes several properties.

One set of properties in the WebPartZoneBase base class define whether or not particular items within the zone are personalizeable. The AllowWebPartPersonalization property of the WebPartZoneBase base class specifies if the particular zone will display the edit link for web parts in this zone. If set to false, drag and drop, as set forth below, is not be allowed for parts in this zone. The LockLayout property of the WebPartZoneBase base class, if set to True, causes the zone to not allow web parts to be moved or added.

Several of the properties of the WebPartZoneBase base class control the ability of the rendered web part to be dragged within a zone or between different zones. The DragMode property of the WebPartZoneBase base class specifies the DragMode used to move parts around the web page. The DragMode property has three values including Image, WebPartTitle and Normal. When the DragMode property is set to Image, the Image specified by the DragImageURL property described below is used. When the value of the DragMode property is set to WebPartTitle, the title bar of the web part is dragged with the cursor. When the DragMode property is set to normal, the entire web part is dragged with the cursor. The DragImageUrl property of the WebPartZoneBase base class, as described above, specifies the image used when the DragMode is set to Image. The DragHighlightColor property of the WebPartZoneBase base class specifies the Highlight color used when a zone is targeted. In other words, this property specifies the color of a placement user interface that is rendered on the client. The placement user interface comprises a border surrounding a target zone, as well as the bar used to indicate an insertion point between other web parts.

The WebPartZoneBase base class 902 further includes various properties for defining how various web parts are displayed within a particular zone. The EditWebPartStyle property of the WebPartZoneBase base class specifies the style used for a web part that is currently being edited. This style is only applied to the web part in Edit mode. The WebPartZoneBase base class 902 overrides any styles set in zone base class PartStyle property.

Figures 11A, 11B:
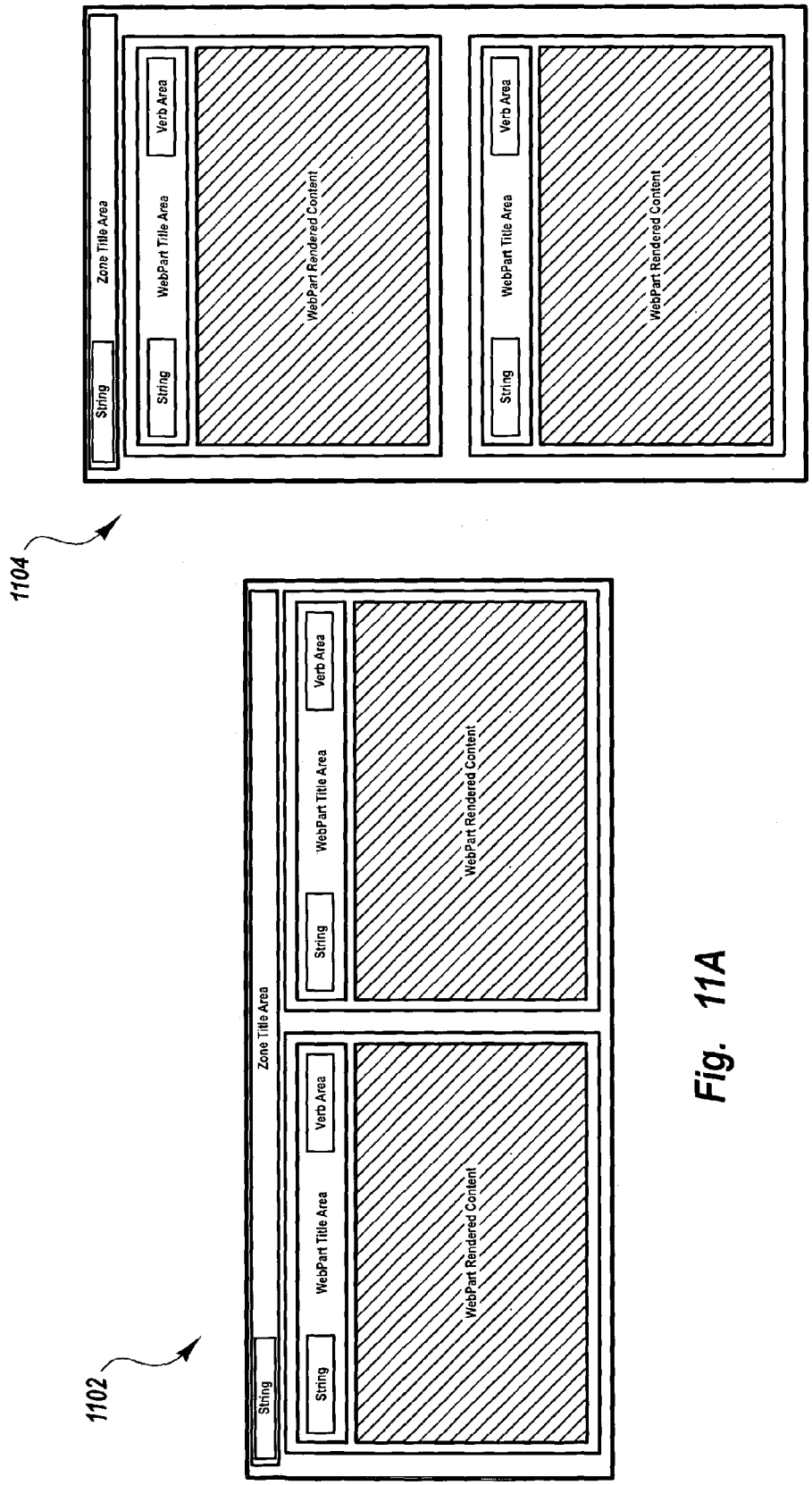
FIG. 11 shows horizontal and vertical layouts for zones that can be accomplished using one embodiment of the invention.

The Orientation property of the WebPartZoneBase base class specifies if the zone lays out web parts horizontally or vertically. FIG. 11A and FIG. 11B illustrate a zone laid out horizontally 1102 and a zone laid out vertically 1104. The PartTitleFonmatString property of the WebPartZoneBase base class specifies how the web part Title and Caption properties are combined to form the title displayed in the chrome. The ShowIconInPartTitle property of the WebPartZoneBase base class specifies if the part icon, a graphical representation of the particular web part, is displayed in the tile bar.

Figure 12:
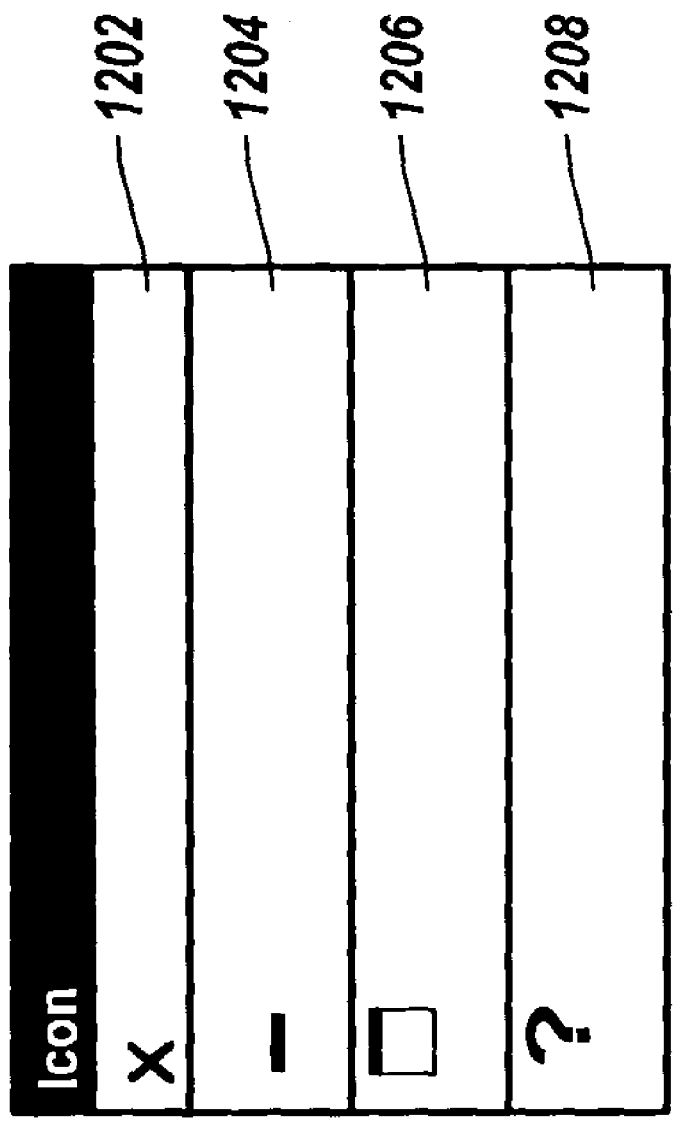
FIG. 12 illustrates graphical examples of verb icons.

Some of the properties of the WebPartZoneBase e base class specify certain characteristics about the appearance of the verbs in a web part. The Verbs property of the WebPartZoneBase base class defines the set of verbs that are applied to all parts in the zone. These are applied between the web part Verbs and the built in zone verbs like WebPartCloseVerb. Examples of Verbs that may be defined include the WebPartCloseVerb to close a web part, the WebPartMinimizeVerb to minimize a web part (only the web part title is displayed), the WebPartRestoreVerb to restore a minimized web part and the WebPartHelpVerb that directs a user to a help URL. Various examples of verb renderings are shown in FIG. 12 that shows a close verb 1202, a minimize verb 1204, a restore verb 1206 and a help verb 1208. The VerbButtonType property of the WebPartZoneBase base class specifies how verbs are displayed. If the WebPartVerb property specifies that the button type is an image but does not define an image URL, the WebPartVerb is rendered as a link button. The VerbStyle property of the WebPartZoneBase base class defines the style which is applied to the verb The WebPartPadding property of the WebPartZoneBase base class defines the padding applied between web parts in the zone. The WebParts property of the WebPartZoneBase base class list the collection of web parts in the zone.

A class that derives from the WebPartZoneBase base class is the WebPartZone class shown in FIG. 9 and designated generally as 908. The WebPartZone class adds a zone Template property so that web parts can be added in the persistence format.

Editor Zone Base Class

The EditorZone base class is designed to render editor parts and the user interface associated with the editor parts. An exemplary editor part 404 is shown in FIG. 4. In one embodiment of the invention, EditorZones render minimum user interface around each editor part. The EditorZone base class 906 includes several properties including: ApplyVerb, CancelVerb, CloseImageUrl, editor parts, ZoneTemplate, FooterStyle, OkVerb, ShowCloseImage, VerbButtonType, VerbStyle, and WebPartToEdit. The EditorZone base class also includes a selection of methods including, ApplyHandler, CancelHandler, OkHandler.

The ApplyVerb property of the EditorZone base class defines the verb that performs the Apply operation, such as for example the Apply verb button 416 shown in FIG. 4. Invoking the verb defined by the ApplyVerb property results in the ApplyChanges property of each editor part being called and the subsequent call of SyncChanges on each editor part.

The CancelVerb property of the EditorZone base class defines the verb, for example the cancel verb button 422 shown in FIG. 4, that performs the Cancel operation. Invoking the CancelVerb returns the web page to normal view through the web part manager as described in more detail below. The CancelVerbDoes not call the ApplyChanges method of any editor parts.

The OkVerb property of the EditorZone base class specifies the verb, such as the OK verb button 420 shown in FIG. 4, that performs an OK operation. Invocation of this verb results in calling the ApplyChanges property on each editor part and subsequently returning the page to a normal mode. The ShowCloseImage property of the EditorZone base class determines if the Close Image is shown at the top right of the zone. The CloseImageUrl property of the EditorZone base class specifies the ImageUrl of the icon displayed in the top right of the zone.

The VerbButtonType property of the EditorZone base class determines the ButtonType used to display each verb. If a WebPartVerb does not specify an image url but (the button type is set to image, the verb text will be rendered as a link button similar to those shown for the OK, Apply and Close verb buttons shown in FIG. 4. The VerbStyle property of the EditorZone base class defines the style applied to each of the zone's verbs.

The WebPartToEdit property of the EditorZone base class specifies the web part that is being edited. This property is delegated to the web part manager in the base class. The editor parts property of the EditorZone base class specifies the read-only collection of editor parts in this zone. The ZoneTemplate property of the EditorZone base class lists the editor parts in the particular EditorZone. The FooterStyle property of the EditorZone base class specifies the style applied to the footer 424 of the particular zone.

In one exemplary embodiment, an EditorZone class receives notification that a web part has entered the edit mode. This causes the EditorZone to build up a new set of editor parts. The EditorZone calls the BuildEditor parts method of the web part currently being edited to obtain any custom editor parts. The EditorZone then instantiates the editor parts in its ZoneTemplate. Changes to the web part being edited can then be made by the user. If the user is satisfied with the changes made, the user can select the OK or Apply verb buttons which will instantiate the ApplyVerb property or OKVerb property as described above.

Catalog Zone Base Class

CatalogZones are used to display catalog parts. Only one Catalog is usually visible at any given time. The CatalogZone base class 904 includes the following properties: AddVerb, AvailableCatalogText, CancelVerb, catalog parts ZoneTemplate, CloseImageUrl, FooterStyle TargetZone, TargetZoneIndex, SelectedCatalog part, ShowCloseImage, ShowTargetZoneUser interface, VerbButtonType and VerbStyle. The Catalog zone further comprises the following methods: AddHandler and CloseHandler.

Several of the properties of the CatalogZone base class 904 define the appearance of the layout and content of the CatalogZone. The AvailableCatalogText property of the CatalogZone base class includes the text placed prior to the list of available catalogs. The ZoneTemplate property of the CatalogZone base class is the template that contains the catalog parts contained in the particular CatalogZone. The Selected catalog part property of the CatalogZone base class specifies the currently selected catalog. This property can have a null value such as when no catalog parts are in this zone. The ShowTargetZoneuser interface property of the CatalogZone base class specifies if the TargetZone user interface is displayed at the bottom of the zone. The FooterStyle property of the CatalogZone base class defines the style applied to the footer of the particular zone.

Several of the properties of the CatalogZone base class 904 define how the Verbs and Verb buttons will be rendered in the CatalogZone. The AddVerb property of the CatalogZone base class is generally placed in the footer of the CatalogZone. When invoked, the Add method of a currently selected catalog part is called. The CancelVerb property of the CatalogZone base class defines the verb that performs the Cancel operation. This returns the Page to normal view. The CancelVerb does not call the Add method on any catalog parts. The CloseImageUrl property of the CatalogZone base class sets forth the ImageUrl of the Icon displayed in the top right of the zone. The TargetZone property of the CatalogZone base class specifies the currently selected TargetZone for this CatalogZone. When Add is called on the selected web part, this will be passed as a parameter. The ShowCloseImage property of the CatalogZone base class specifies if the Close Image is shown at the top right of the CatalogZone. The VerbButtonType property of the CatalogZone base class specifies the ButtonType used to display each verb. If web part Verb has no image url but the button type is set to image, the text is rendered as a link button. The VerbStyle property of the CatalogZone base class defines the style applied to each of the zone's Verbs.

Still other properties of the CatalogZone base class help to manage the catalog parts of a particular CatalogZone. The catalog parts property of the CatalogZone base class lists the Collection of catalog parts in the particular CatalogZone. The TargetZoneIndex property of the CatalogZone base class defines the index where parts should be added in the TargetZone.

Web Part Manager

The third general group of base classes is the web part manager base class. The web part manager base class tracks the web parts on the web page, tracks the zones on the web page and tracks which web parts are in each zone. The web part manager also, handles personalization of the web page by tracking the edit state of the web page. To facilitate connections such as is shown and described in FIG. 6, the web part manager keeps track of connections between web parts and initiates connection communication between web parts. The web part manager may be connected to and rely on a database for web part definitions and personalization. The web part manager is also responsible for rendering any script needed to handle client operations, such as dragging web parts while in edit mode. The web part manager may be added to the web page, like any other control, through the persistence format in one example. Only one instance of the web part manager typically appears on a web page.

A web page has various phases throughout its lifetime. These phases include: initialize, load, prerender, save state, render, dispose and unload. The web page manager may have interaction with other parts on the web page throughout some of these phases. During the initialize phase, the web page manager is instantiated, the zones are instantiated, the zones register themselves with the web part manager and a control tree is constructed with web parts from templates. During the load phase, a signal is connected to the web parts about connections and the web part manager sets the Connections property on each of the web parts. During the prerender phase, the web part manager client script blocks are registered. During the render phase, the web part manager tracks and controls how the zones and web parts render content.

The web part manager includes several properties to accomplish the functionality described above, including: DisplayMode, WebPartToEdit, ClosedWebParts and web parts zones. The web part manager also includes several methods including: AddWebPart, BeginWebPartEditing, CreateConnection, DeleteWebPart, EndWebPartEditing, XmlDocument Export, Import, MoveWebPart, RegisterConnectionEndPoint, RegisterZone and SetDisplayMode.

Figure 3:
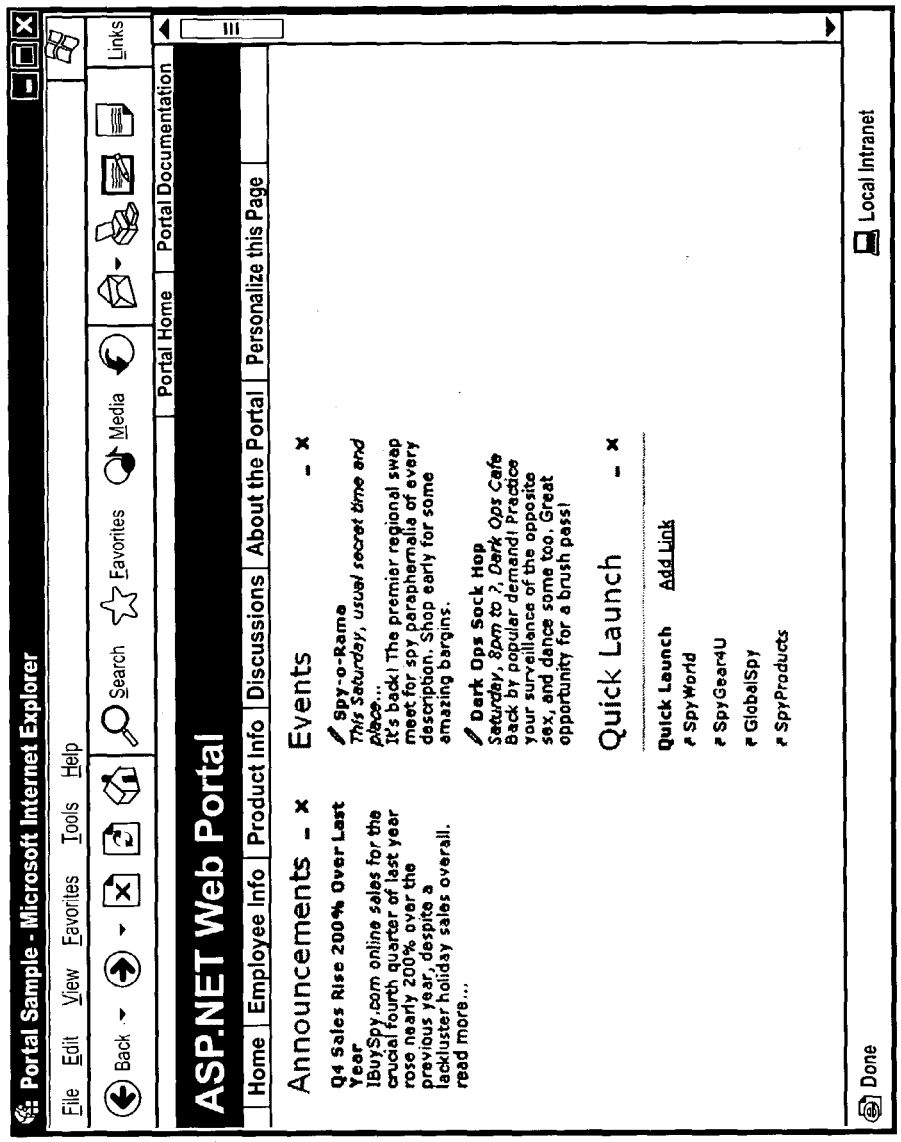
FIG. 3 illustrates another example of a modular web portal.

The DisplayMode property of the web part manager base class defines the current DisplayMode of the page. Options include Normal, Edit, Design, Catalog etc. An example of the Normal display mode is shown and described in FIGS. 1 through 3. When the web page is display mode, the web parts are displayed in normal mode and the EditorZone, CatalogZone and zone borders are not visible. An example of the Edit display mode is shown and described in FIG. 4. When the web page is in the edit display mode, the web parts are rendered in an edit mode and the EditorZone and zone borders are visible while the CatalogZone is not visible. An example of the Catalog display mode is shown and in FIG. 5A. When the web page is in catalog display mode, the web parts are rendered in a normal mode and the CatalogZone and zone borders are visible while the EditorZone is not visible. When the web page is in a design display mode, the web parts are rendered in a normal mode and the zone borders are visible while the EditorZone and the CatalogZone are not visible. Individual web parts may be in edit mode. This allows a web part to display user interface in line or display any associated editor parts in the EditorZone. Web parts are notified of the current mode via the following events: ClosedWebPartsChanged, DisplayModeChanged, DisplayModeChanging, WebPartAdded, WebPartEditModeChanged, WebPartEditModeChanging, and WebPartDeleted.

The WebPartToEdit property of the web part manager base class is used when the web page is in edit mode to identify the web part that is currently being edited. This property is used by the editor zone and editor parts. The ClosedWebParts property of the web part manager base class identifies the set of web parts that have their visible property set to false. The WebParts property of the web part manager base class identifies all of the web parts that the web part manager is responsible for including both parts that are statically on the page and those that have been added dynamically.

The Zones property of the web part manager base class identifies the set of web part zones that the web part manager is currently managing. Each web part zone will register itself with the web part manager in OnInit, which then adds the zone to this set. Later in the web page life cycle, each zone then calls web part manager GetWebPartsForZone to discover what web parts the zone currently contains. WebPartZones's call the RegisterZone on the web part manager optionally passing an initial set of web parts. WebPartZone can then call GetWebPartsForZone to discover what web parts have been assigned to the particular zone. The GetWebPartsForZone method, described below, allows the zone to determine what web parts they are responsible for rendering. This method evaluates the web part manager's web parts collection to see which web parts belong to the appropriate zone. The web parts Manager filters the web parts according to WebPart.Zone, WebPart.Visible, and WebPart.Roles. The zone is then responsible for checking if the particular web part is hidden.

Various methods are available in the web part manager base class. The BeginWebPartEditing method of the web part manager base class is called to begin editing a web part. The WebPartEditModeChanging and WebPartEditModeChanged events will fire when this method is called. If a web part is already in edit mode, EndWebPartEditing is called. If successful, the WebPartToEdit property will be set to the web part parameter value.

The EndWebPartEditing method of the web part manager base class is called to end the BeginEditingWebPart method. WebPartEditModeChanging and WebPartEditModeChanged events will fire when this method is called. If successful the WebPartToEdit property will be cleared.

The MoveWebPart method of the web part manager base class is called to move web parts between zones. To call the method three parameters are used: the WebPart parameter specifies the web part to move, the Zone parameter specifies the target zone, and the ZoneIndex parameter specifies the Index at which the web part should be added in the target zone.

The Get WebPartsForZone method of the web part manager base class is called by each zone when it needs to render its contained web parts. The GetWebPartsForZone method allows zones to determine what web parts they are responsible for rendering. This method evaluates the web part manager's web parts collection to see which web parts belong to the appropriate zone. The web part manager will filter the web parts according to WebPart.Zone, WebPart.Visible, and WebPart.Roles. The zone is then responsible for checking if the particular part is Hidden. This method returns a collection of web parts.

Figure 13:
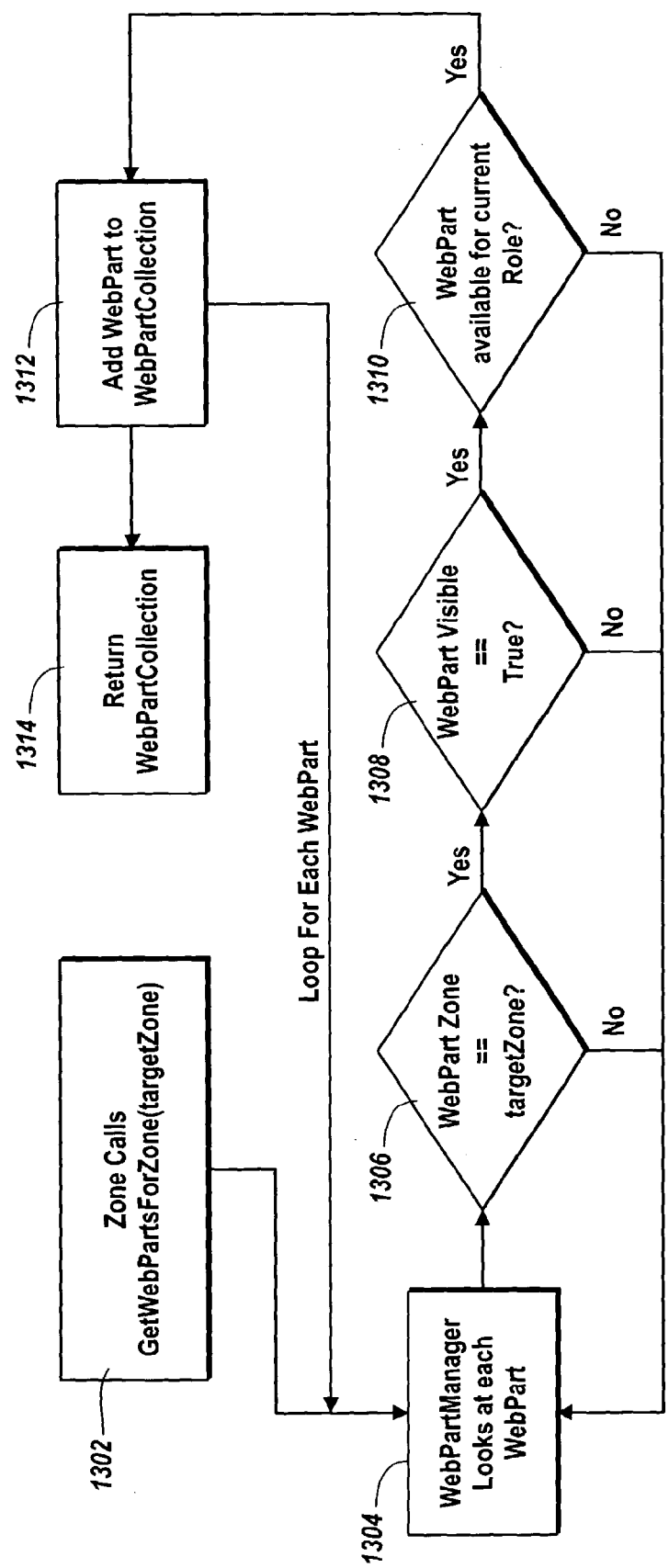
FIG. 13 illustrates a flow chart for determining which web parts to place in a zone.

A detailed flow chart illustrating the method for determining the collection of web parts to be returned is shown and described in FIG. 13. The method begins as the zone calls the GetWebPartsForZone method (1302). The web part manager looks at each part (1304). The web part manager checks to see if the zone specified in the web part is the target zone (1306). If the zone is not the target zone, the process returns to check other web parts. If the zone is the target zone, the web part manager checks to see if the Visible property of the web part is set to true (1308). If the Visible property is not set to true, the process returns to check other web parts. If the Visible property of the web part is set to true, the web part manager checks to see if the web part is available for the current Role (such as in personalization, customization, and development scenarios) (1310). If the web part is not available for the current Role as defined by the Role property of the web part, the process returns to check other web parts. If the web part is available for the current Role, the web part is added to the WebPartCollection property of the particular zone (1312). The WebPartCollection is then returned (1314) to the web part manager and the process loops to continue checking each of the web parts.

The AddWebPart method of the web part manager base class is called to add a web part to the web page. Any web parts that are added through this method are considered dynamic and can later be deleted. The AddWebPart method takes either an instance of a web part, or a XML DWP file. In either case, the web part manager typically creates a dynamic control. Three parameter are specified in this example of the method: the WebPart parameter identifies the web part to add to the web page, the Zone parameter specifies the zone to which the web part should be added, and the ZoneIndex parameter specifies the Index in the zone where the web part should be added.

The RegisterConnectionEndPoint method of the web part manager base class is called by web parts that wish to register ConnectionEndPoints such that the web parts can be interconnected through connections as described above. The parameter that is past in this method is the ConnectionEndPoint, which specifies the ConnectionEndPoint that is being registered.

The RemoveWebPart method of the web part manager base class is called when a web part should be removed from the page. This method clears out any personalization settings on the part. For parts that are declared on the page (and thus can not be removed) the method sets the visible property to false. For parts that have been dynamically added to the page, the reference to the dynamic web part is removed. The parameter that is passed in this method is the web part parameter, which specifies the web part to remove.

The SetDisplayMode method of the web part manager base class sets the display mode of the web page. This method will fire the WebPartDisplayModeChanging and WebPartDisplayModeChanged events described below. Additionally, if the web page is moved out of Edit Mode when there is a part currently being edited, the method will end editing of the web part. The parameter passed with this method is the DisplayMode parameter, which sets the target web part DisplayMode.

The web part manager includes several events including: ClosedWebParts Changed, DisplayModeChanged, DisplayModeChanging, WebPartAdded, WebPartEditModeChanged, WebPartEditModeChanging, and WebPartDeleted. The ClosedWebPartsChanged event of the web part manager base class is fired when a part is closed or removed from the CloseWebParts collection. The DisplayModeChanged event of the web part manager base class is fired after the DisplayMode has changed. The DisplayModeChanging event of the web part manager base class is fired before changing the DisplayMode. Handlers of this event can adjust the EventArguments to prevent the DisplayMode from changing. The WebPartEditModeChanged event of the web part manager base class is fired after a web part has been put into, or removed from EditMode. The WebPartEditModeChanging event of the web part manager base class is fired before a web part is placed in, or removed from EditMode.

In cases where web parts are declared in a Database instead of the persistence format of web part zones, developers can extend the web part manager. The CreateChildControls method should be overridden to fetch web parts from an alternate source. The WebPartCollection properties on the web part manager relies on its child controls, so these propertied need not be overridden. The Delete, Add, and Move methods would also be likely overridden to interact with an alternate Data store.

Understanding the basic functions of the base classes described above, the part base class, the zone base class and the web part manager base class, certain other features can be explained in the context of the interoperation of the base classes and controls derived from them. Some of this extended functionality includes import and export functionality, connections between web parts and web part configuration.

Applications can allow for export and import functionality of web part properties. This allows users to share their web part settings. When an export is performed, a complete XML representation of the web part properties is created. The format of this document is an XML file and controlled by the web part's usage of the XML serialization metadata attributes. That XML document can then be imported. Typically, only properties marked as personalizeable are included in the final XML representation of the part. In one embodiment of the invention, an export button could be created on a web part to enable the export functionality.

An XML format is used to describe a web parts personalized property settings. The file contains the TypeName, AssemblyName and values for the various properties of the web part. Once the file is uploaded, the web part manager instantiates the specified object, parses the XML in the file and applies the properties to the object. This web part is then added to the web part collection of the page and can be treated as any other dynamic part.

Web parts may be connected to share information & functionality. Connections, as described in connection with the description of FIG. 6, work through a paired Consumer and Provider model. Parts which support connection functionality must register themselves with the web part manager. The web part manager is then responsible for hooking up the connection between parts.

For web parts to Connect, the following steps take place: Consumer and Provider web parts register ConnectionEndPoints with the web part manager; the web part manager asks providers for connection object via a delegate; the web part manager notifies web parts that they are connected via the delegate; and the web parts communicate via understood connection interfaces. Connections can be defined in the persistence format of the web part manager through the Connections property.

The Connections model is based on a Provider and Consumer on each end of the connection. Each connection works over a primary connection interface. This Interface is understood by both the Provider and Consumer. Only the Provider needs to implement the Interface, because the consumer simply calls through to interface methods, properties and events. Connections are not typically bi-directional, unless the semantics of the specific provider and consumer allow them to perform bi-directional communication.

The framework contains primary support for server side connections. Server side connections occur during the page execution and are only active during the web page lifecycle. Client side connections are connections that occur on the client without the need for a post-back. The connection framework allows connected parts to communicate on the client, if both the provider and consumer implement the support for client-side communication. This allows third parties to build in support for client side connections.

The web part manager is responsible for tracking and initializing all web part communications. The connection process begins when each web part registers ConnectionEndPoints with the web part manager. At the appropriate stage in the lifecycle, the web part manager then calls the delegate for the provider, at which point the provider either returns itself, or an instance of another connection object. After the web part manager receives a connection object, it calls the delegate for ConnectConsumerCallBack. At this point the consumer is free to communicate via the appropriate connection interfaces.

Web parts who wish to participate in connections define one or more ConnectionEndPoints, which are used by the web part manager to hook together web parts. Each ConnectionEndPoint contains several properties which identify the ConnectionPoint on the Part. Name defines the name of the ConnectionPoint, for example "SelectedRow." Connection Interface defines the primary Interface for this connection, for example IFieldData. CallBack Delegate is used by Providers to point to the method which will return the object that implements the ConnectionInterface and used by Consumers to point to the method which will receive the object that implements the ConnectionInterface. Description includes text which describes the ConnectionEndPoint to the end user for example "Provide selected Row to . . . "

RegisterProvider is called by Provider web parts in OnInit. The GetConnectionCallback argument is a delegate to the method which will be responsible for creating the Connection object. An example of Provider calling RegisterProvider method is as follows:

```
Class MyListPart : web part, IRow
{
    // Register the web part as a provider
    // IRow is the primary connection interface
    public override OnInit ( ) {
        // Create a new ConnectionEndPoint
        ConnectionEndPoint endpoint = new ConnectionEndPoint(
            Typeof(IRow), new
ConnectionProviderCallback (MyCreateConnection));
        endPoint.Name = "RowProvider";
        endPoints.Description = "Provide Row To";
        // Register the ConnectionEndPoint with tha web part manager
        RegisterConnectionEndPoint (endPoint);
    }
    // Function called by CreateConnection Delegate,
    // Since this part implements the connection, just return this
    public object MyCreateConnection( ) {
        return (this) ;
    }
    /* Implement IRow
        & web part functionality
    */
}
```

RegisterConsumer is called by Consumer web parts in OnInit. The ConnectionConsumerCallback parameter is a delegate to the method that is responsible for accepting the connection. An example of a Consumer web part calling the RegisterConsumer method is as follows:

```
class MyFormPart : web part
    // Register the web part as a consumer
    // IRow is the primary connection interface
    public override OnInit( ) {
        //Create the ConnectionEndPoint
        ConnectionEndPoint endpoint = new ConnectionEndPoint(
            Typeof (IRow), new
ConnectionConsumerCallback(MyConnectToProvider));
        endPoint.Name = "RowConsumer";
        endpoint.Text = "Retrieve Row From";
        // Register the connectionEndPoint with the web partManaager
        RegisterConnectionEndPoint (endPoint);
    }
    //Function called by delegate when this connection is established
    public void MyconnectToProvider(object obj) {
        // Logic to handle Connection
    }
}
```

Figure 14:
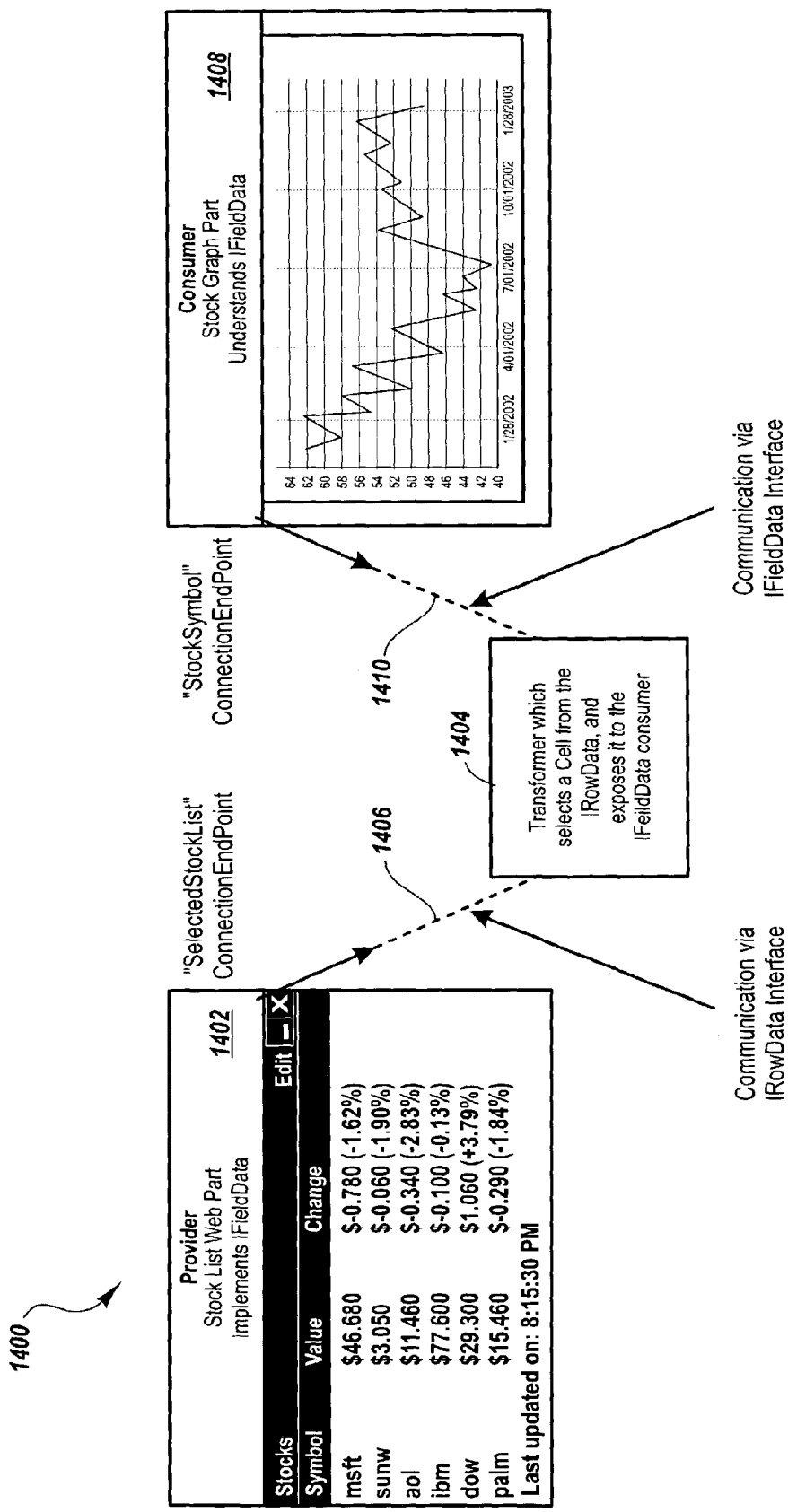
FIG. 14 illustrates a transformer used to connect one web part with another web part.

Transformers are objects which have logic to convert one ConnectionInterface to another. For example a Transformer could allow parts which understand IFieldData to talk to Parts that Implement IRowData. To do this, the transformer would choose the appropriate cell from the RowData sent by the Provider and expose it to the consumer. The IConnection interface is implemented by all Transformers involved in connections. It is used to query which connection interfaces are available. The The function of one embodiment of a transformer is shown in FIG. 14. A provider web part 1402 is illustrated as a Stock List web part. The provider web part 1402 comprises a SelectedStockList ConnectionEndPoint. The provider web part 1402 is coupled to a Transformer 1404 through a first communication interface 1406 that in this example is IRowData interface. These interfaces are set forth below in more detail. The Transformer 1404 converts the data transmitted along the first communication interface 1406 to a format that is readable by a consumer web part 1408 such as the stock graph part illustrated in this example. The appropriate data is then sent along a second communication interface 1410 to the consumer web part 1408.

The GetConnectionInterface method lives on the base WebPartClass. It allows web parts to check if the ConnectionObject they are using implements additional Connection Interfaces. This method should be used in the case when a transformer is present for the primary connection Interface.

Consumer web parts communicate to a Provider through a Provider interface. This interface defines how the Consumer can expect to interact with the Provider. Several provider interfaces will be implemented by the framework. For example, IFieldData provides an interface to a single cell of data. The IRowData provides an interface to a row of a list. The IRowData interface is suitable for selection driven actions. The IListData provides an interface to the entire List. This IListData interface is suitable for web parts that provide an alternate view of the entire dataset. The IFilter interface is used to set a filter and/or sort expression for a list. The IModifyRow interface can be used to insert, update and delete a row in the list.

When a web part registers itself, it identifies the provider interface which it understands. A web part may make several calls to RegisterConsumer/RegisterProvider methods to indicate that they understand multiple interfaces. For example, a list part could support both IRow, and IModifyRow. A Consumer part could also understand both of these interfaces. A web part may also decide to implement the same interface twice, with different semantics. For example, a List web part may support IRow for both the currently selected row and for the current row over which the mouse is hovering. This can be accomplished by implementing two separate connection classes that both implement IRow.

Associated with each of these connection classes could be varying support for secondary connection interfaces. For example IRowModify would be supported for the selected row, but not the hover row. Once two web parts are connected, the consumer could query the provider for what interfaces it supports. This is accomplished through the GetConnectionInterface method defined on the web part base class. Developers who wish to share more advanced functionality across a connection, can implement a custom provider interface which their consumer web parts understand.

A GetConnectionCallback is used as a delegate to the function that is responsible for actually creating and returning the connection object. It is referenced in the RegisterConnection method. The method which receives the actual call must match the GetConnectionCallback method signature.

A ConnectConsumerCallback is used by consumer parts to identify a method that will be called when a particular connection is established. This delegate is used in the RegisterConsumer method.

The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for enabling the creation of modular web applications, the method comprising:
    providing a web application development framework comprising
    a Part base class comprising at least one property selected from the group comprising Description, FrameState, FrameType, LargeIconImageUrl, Roles, SmallIconImageUrl, Title, and TitleStyle;
    a plurality of web part controls including a WebPart base class, a CatalogPart base class, and an EditorPart base class, wherein the WebPart base class, the CatalogPart base class, and the EditorPart base class each derive from the Part base class, wherein the WebPart class includes a Connections property, a HelpURL property, and a WebPartHelpMode property, wherein the EditorPart class includes an AllowMinimize property, a WebPartToEdit property, and a Display property, wherein the CatalogPart includes an AvailableParts property and a web part manager property, wherein each web part control has one or more properties that permit each part to derive and inherit properties and to be rendered automatically with other part controls and to be rendered like other part controls; a plurality of zone controls, wherein each zone control arranges at least one of the one or more part controls within each zone, renders an user interface of each of the one or more part controls within each zone, and wherein each zone control is configured to ensure that each of the one or more web part controls in each respective zone, in which the one or more web part controls are found, has a similar appearance by applying zone properties automatically to each web part control found in a corresponding zone, the zone controls including:

a web part zone that is used to arrange web parts contained in the web part zone, a catalog zone that is used to arrange catalog parts contained within the catalog zone, and an editor zone that is used to arrange editor parts contained within the editor zone; and a web part manager that tracks
the one or more web parts on the web page,
the one or more zones on the web page, and
which of the one or more web parts are within each zone.

2. A method as defined in claim 1, wherein the one or more properties of each part control enable a particular zone control to render the user interface for each part control within the particular zone control and where a functionality of each part control is different.

3. A method as defined in claim 1, wherein the part controls are created from one or more part base classes.

4. A method as defined in claim 3, wherein the one or more part base classes include a part base class, a web part base class that derives from the part base class, a catalog part base class that derives from the part base class, and an editor part base class that derives from the part base class.

5. A method as defined in claim 4, wherein the editor part base class is used for modular controls that set control properties including one or more of personal settings, layout properties for the one or more part controls, and behavior properties for the one or more part controls.

6. A method as defined in claim 4, wherein the catalog part base class is used for modular controls that provide a catalog of web parts that can be added to at least one zone control.

7. A method as defined in claim 5, wherein the one or more zone controls are created from one or more zone base classes.

8. A method as defined in claim 7, wherein the one or more zone base classes include a zone base class used to layout controls that inherit from a part base class; a web part zone base class that derives from the zone base class and is used for web part controls; an editor zone base class that derives from the zone base class and is used to layout editor part controls used to layout editor controls, and a catalog part base class used for catalog controls.

9. A method as defined in claim 1, wherein the web part manager is a part control and each zone control registers with the web part manager.

10. A method as defined in claim 9, wherein the web part manager tracks connections between the one or more part controls and wherein the web part manager adds, removes, and moves part controls from a web page.

11. A method as defined in claim 1, wherein at least some of the one or more part controls include an interface for communicating with other part controls.

12. A method as defined in claim 11, wherein the at least some of the one or more part controls register end points of the interface with the web part manager.

13. A method as defined in claim 1, wherein at least some of the one or more part controls include a plurality of interfaces for communicating with other part controls and wherein the at least some of the one or more part controls register the plurality of interfaces with the web part manager.

14. A method as defined in claim 13, wherein at least some of the plurality of interfaces are the same interface with different semantics.

15. A method as recited in claim 1, further comprising:
a part base class from which part controls are derived, wherein the part controls include one or more of a web part, a catalog part, and an editor part; and a zone base class from which zone controls are derived.

16. The method as set forth in claim 15, wherein each instance of a part control is defined in an instance of a zone control.

17. The method as set forth in claim 15, wherein each instance of a part control within a particular zone control has a similar user interface.

18. The method as set forth in claim 15, wherein at least some of the part controls include a connection end point for connecting with another part control within the same zone control or within another zone control.

19. The method as set forth in claim 15, wherein the editor zone is adapted to provide for user input of properties defined in the part base class.

20. The method as set forth in claim 19, wherein the properties are exportable.

21. The method as set forth in claim 20 wherein the user input of properties is exported using an XML document.

22. The method as set forth in claim 15, further comprising a web part manager class wherein the web part manager class tracks any instances of the part controls contained within the zone controls.

23. The method as set forth in claim 22, wherein a particular part control can be dragged and dropped within the same zone control or to another zone control.

24. The method as set forth in claim 15, wherein a particular catalog part is adapted to provide a list of web parts that may be selected by a user to be added to a particular zone control, wherein the particular catalog part includes means for allowing a user to select from the list of web parts that are added to the particular zone control of a web page.

25. The method set forth in claim 15, wherein each part control is declared in a persistence format file.

26. The method as set forth in claim 15, where the part base class includes one or more of:
properties to ensure that each part control is rendered with a similar user interface;

a frametype property to define how a particular zone control renders a user interface around each part control in the particular zone;
a roles property to define which users a particular part control is available; and
one or more part icons for each part control.

27. The method as set forth in claim 15, wherein each web part includes one or more of:
a connection interface for communicating with other web parts;
an enable personalization property for enabling personalization of the web part;
a help property;
one or more allow properties that determine what user interface is exposed to an end user;
a frame state to define if a web part is minimized, maximized or normal,
a hidden property such that the web part is not displayed when true;
a zone property to identify a zone control that contains the web part;
a zone ID that contains an ID of the zone control;
a zone index that includes an index of the zone control relative to other web parts in the zone control.

28. The method as set forth in claim 27, wherein the editor part is one or more of:
an appearance editor part that sets user interface properties of a web part, wherein the user interface properties include one or more of a title, a height, a width, a framestate, and a frame type;
a layout editor that sets layout properties of a web part, wherein the layout properties include one or more of a hidden property, a zone property, and a zone index property;
a behavior editor part that sets behavior properties;
a property grid browser editor part that displays properties marked as web browsable; and
a custom editor part.

29. The method as set forth in claim 15, wherein the catalog part exposes a user interface that permits an end user to add new web parts to a web page.

30. The method as set forth in claim 15, further comprising a web part manager that manages all part controls on a particular web page, wherein the web part manager is responsible for one or more of:
tracking web part controls on the particular web page;
tracking web part zone controls on the particular web page;
keeping track of connections between part controls on the particular web page;
initiating communication between part controls; and
tracking an edit state of the particular web page.

31. The method as set forth in claim 30, wherein the web part manager exposes one or more methods for adding, removing, and moving part controls.

32. The method as set forth in claim 31, wherein the one or more methods are invoked by catalog parts, editor parts, and zone controls.

33. The method as set forth in claim 29 wherein the user interface may be used by an administrator to add new web parts to a web page for all users.

34. The method as set forth in claim 19 wherein the user input of properties sets those properties for all users, and the user input of properties is performed by an administrator.

35. The method as set forth in claim 15 wherein properties are defined in the part base class, those properties being definable in a persistence format by a web page developer.

36. A method as recited in claim 1, further comprising:
declaring at least one zone control in a persistence format file, wherein each zone control derives from a zone base class;
declaring at least one web part control in each zone control, wherein the web part control derives from a part class; and
rendering, by each zone control, user interface elements of each zone control and some user interface elements of the at least one web part control such that each at least one web part control has a similar appearance within each zone.

37. A method as defined in claim 36, wherein declaring at least one web part control in the zone control further comprises declaring the at least one web part control in a control format file.

38. A method as defined in claim 37, further comprising declaring a web manager part, wherein the web manager part tracks the at least one web part control in each at least one zone control.

39. A method as defined in claim 38, further comprising the web manager part initiating a connection between a first web part control and a second web part control such that the first web part control communicates with the second web part control.

40. A method as defined in claim 36, further comprising exporting a particular web part or properties of the particular web part.

41. A method as defined in claim 36, further comprising importing a particular web part or properties of the particular web part.

42. A method as defined in claim 41, further comprising setting at least a portion of the properties of a current web part control using imported properties.

43. A method as defined in claim 36, further comprising defining a roles property for each web part control to specify users that can access each web part control.

44. A method as defined in claim 36 further comprising one or more of:
editing a particular web part control using an editor part that derives from the part class, wherein the editor part is contained within an editor zone;
adding additional web part controls to a particular zone using a catalog part that derives from the part class, wherein the catalog part is contained within a catalog zone;
removing selected web part controls from a zone;
permitting one or more properties of each web part control to be customized by an end user; and
allowing end users to share personalizations to web part controls.

45. A method as defined in claim 36, further comprising using properties of the part controls to enable an end user personalize the part controls.

46. A method as defined in claim 36, further comprising using properties of the part controls to prevent an end user from personalizing the part controls.

47. A method as defined in claim 36, further comprising declaring properties in the persistence format to control the rendering of the user interface elements to all end users.

48. A method as defined in claim 36 further comprising interacting with the user interface elements of each zone control and the some user interface elements of the at least one web part control to control the similar appearance for all users.

49. A computer readable storage media having computer executable instructions for performing the method of claim 1.

50. A method as recited in claim 1, further comprising:
providing a plurality of zones, each controlled by a corresponding zone control that is configured to render user interface elements of each zone control and some user interface elements in such a manner that each of the one or more web part controls in each respective zone, in which the one or more web part controls are found, has a similar appearance.

51. A method as recited in claim 1, wherein the catalog zone provides a plurality of selectable web control parts that, after being selected, can be divided through multiple web pages.

52. A method as recited in claim 51, wherein the multiple web pages are linked.

53. A method as recited in claim 1, wherein the similar appearance includes a look and feel, a boarder and controls.

54. A method for creating modular web applications, the method comprising:
providing a framework comprising:
one or more web part controls, wherein each part control has one or more properties that permit each part to be rendered like other part controls;
one or more zone controls, wherein each zone control arranges at least one of the one or more part controls within each zone, and wherein each zone control is configured to ensure that each of the one or more web part controls in each respective zone, in which the one or more web part controls are found, has a similar appearance by applying zone properties to each web part control found in a corresponding zone, the zone controls including:
a web part zone that is used to arrange web parts contained in the web part zone;
a catalog zone that is used to arrange catalog parts contained within the catalog zone; and
an editor zone that is used to arrange editor parts contained within the editor zone;
a web part manager that tracks which of the one or more part controls are within each zone control; and
wherein the zone properties include a PartStyle property, a PartFrameType property, a Part Title Horizontal Align property, a PartTitleStyle property, a PartVerbStyle property and a PartContentStyle property.

* * * * *